FREQUENCY MODULATION- CONSTANT CARRIER FREQUENCY

PHASE MODULATION-AMPLITUDE MODULATION-CONSTANT CARRIER FREQUENCY

FREQUENCY MODULATION PLUS PHASE MODULATION-AMPLITUDE MODULATION-CONSTANT CARRIER FREQUENCY

PHASE MODULATION-FREQUENCY MODULATION
CONSTANT CARRIER FREQUENCY

VARYING CARRIER FREQUENCY-INCOHERENT

VARYING CARRIER FREQUENCY-INCOHERENT

VARYING CARRIER FREQUENCY - TIME DIVISION MULTIPLEX

VARYING CARRIER FREQUENCY - TIME DIVISION MULTIPLEX

LINEAR VARYING CARRIER FREQUENCY - COHERENT

March 10, 1970 A. P. CLARK 3,499,995

FREQUENCY AND TIME DIVISION MULTIPLEX SIGNALLING SYSTEMS USING SUCCESSIVE CHANGES OF FREQUENCY BAND AND TIME SLOT

Filed June 22, 1966 11 Sheets-Sheet 4

LINEAR VARYING CARRIER FREQUENCY - COHERENT $SIN^2$ VARYING CARRIER FREQUENCY - COHERENT

March 10, 1970 A. P. CLARK 3,499,995

FREQUENCY AND TIME DIVISION MULTIPLEX SIGNALLING SYSTEMS USING SUCCESSIVE CHANGES OF FREQUENCY BAND AND TIME SLOT

Filed June 22, 1966 11 Sheets-Sheet 5

March 10, 1970 A. P. CLARK 3,499,995

FREQUENCY AND TIME DIVISION MULTIPLEX SIGNALLING SYSTEMS USING SUCCESSIVE CHANGES OF FREQUENCY BAND AND TIME SLOT

Filed June 22, 1966 11 Sheets-Sheet 6

WAVEFORM ILLUSTRATING FIG. 18

March 10, 1970 A. P. CLARK 3,499,995

FREQUENCY AND TIME DIVISION MULTIPLEX SIGNALLING SYSTEMS USING SUCCESSIVE CHANGES OF FREQUENCY BAND AND TIME SLOT

Filed June 22, 1966 11 Sheets-Sheet 8

WAVEFORMS ILLUSTRATING FIG. 22

WAVEFORM ILLUSTRATING FIG. 25

March 10, 1970 A. P. CLARK 3,499,995

FREQUENCY AND TIME DIVISION MULTIPLEX SIGNALLING SYSTEMS USING SUCCESSIVE CHANGES OF FREQUENCY BAND AND TIME SLOT

Filed June 22, 1966 11 Sheets-Sheet 10

United States Patent Office 3,499,995

Patented Mar. 10, 1970

3,499,995

FREQUENCY AND TIME DIVISION MULTIPLEX SIGNALLING SYSTEMS USING SUCCESSIVE CHANGES OF FREQUENCY BAND AND TIME SLOT

Adrian P. Clark, Taplow, England, assignor to British Telecommunications Research Limited, Taplow, England, a British company Filed June 22, 1966, Ser. No. 559,470
Int. Cl. H04j 3/02
U.S. Cl. 179—15 21 Claims

ABSTRACT OF THE DISCLOSURE

In a frequency and time division multiplex electrical signalling system for transmitting digital signals, a predetermined sequence of combinations of frequency bands and time slots is employed. The combination of frequency bands and time slots used by a particular channel is changed after a period of time indicated by the message being transmitted, for example after transmission of each digit. The changes in frequency band and time slot combinations for the various channels are not synchronised with each other.

The present invention relates to electrical signalling systems employing a common transmission path which is arranged to provide a plurality of separate channels.

One known arrangement is for such a system to operate on a frequency division multiplex basis whereby the available frequency spectrum of the transmission path is divided into a plurality of bands, one such band being allocated to each channel. It is also known for such a system to operate on a time division multiplex basis whereby the time continuum is divided into frames of equal duration the various channels each being separately sampled once during each frame.

It has already been appreciated that these two systems may be combined whereby the frame characteristic of a time division multiplex system and the frequency bands characteristic of a frequency division multiplex system together form an arrangement which will be referred to hereinafter as a frequency time matrix, a unit area of which can be defined by a frequency band and a time slot. It can then be arranged that each receiver has a so-called address comprising a unique combination of a predetermined number of unit areas of the matrix which is used for calling the receiver. Assuming that the signals are in the form of a digital code, one element being transmitted in each matrix, the same combination may be used for the digit 1 and a different but preferably related combination for the digit 0. The parts of an element transmitted in the various portions of the matrix will be referred to as sub-elements. If, as would most likely be the case, there is no synchronisation between the different transmitters using the common transmission path, a frequency-time matrix in one channel may have any phase relative to one in another channel.

With this arrangement, signals on a relatively small number of other addresses have a comparatively high probability of causing interference in the channel associated with the first mentioned address. Consequently such an arrangement is satisfactory for some purposes. However because it originates in a small number of channels, the said interference will be sporadic and perhaps at a comparatively high level and hence at times it may be intolerable. To overcome this difficulty it is possible to arrange that when a channel is suffering from severe interference, automatic switching takes place to an alternative address for which the likelihood of serious interference is much reduced. Alternatively or in addition, arrangements may be made for automatically altering the speed of the transmitter which will serve to adjust the phase of the transmitted frequency-time matrices for the minimum interference from other channels. Either of these arrangements however is dependent upon a return signal and uses a feedback loop and this leads to an increase in equipment complexity and the former expedient results in a reduction in the number of available independent addresses.

Whereas the number of different addresses obtainable with a given frequency-time matrix is considerably influenced by the number of sub-elements in the combination and the modulation method used for each of these to represent the digits 1 and 0, the maximum number of different channels which may be used simultaneously for an acceptable level of inter-channel interference is determined largely by the number of unit areas in the frequency-time matrix.

According to the invention, the apparatus for transmitting and receiving one of a plurality of separate information-bearing signals on a common transmission path, in which the transmitting apparatus comprises means for generating a carrier signal arranged to be modulated by the information bearing signal and to occupy one address in a frequency-time matrix as hereinbefore defined, and means for changing the address occupied by the carrier signals to the next address in a predetermined sequence of addresses after each frequency-time matrix has been transmitted, and in which the receiving apparatus comprises means for receiving and demodulating information-bearing signals transmitted on a particular address and means for changing such address to the next address in the predetermined sequence after each frequency-time matrix has been received.

A unique discrete address in the frequency time matrix is allocated to each receiver but this is used only for the purpose of setting up a connection.

The invention will be more readily understood from the following detailed description with reference to the accompanying drawings, in which:

FIGS. 1 and 2 show the positions in the frequency-time matrix of a typical digit 1 and the corresponding digit 0 respectively when transmission is by frequency modulation of a constant carrier-frequency signal;

FIGS. 3 and 4 show the frequency-time matrix of a typical digit 1 and the corresponding digit 0 when transmission is by phase modulation-amplitude modulation of a constant carrier-frequency signal;

FIGS. 5 and 6 show the frequency-time matrix of a typical digit 1 and that of the corresponding digit 0 respectively when transmission is by frequency modulation plus phase modulation-amplitude modulation of a constant carrier-frequency signal:

FIGS. 7 and 8 show the frequency time matrix of a typical digit 1 and the corresponding digit 0 respectively when transmission is by phase modulation-frequency modulation of a constant carrier-frequency signal;

Figure 11:
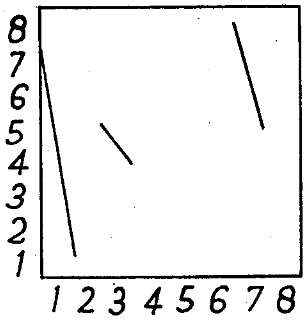
Figure 12:
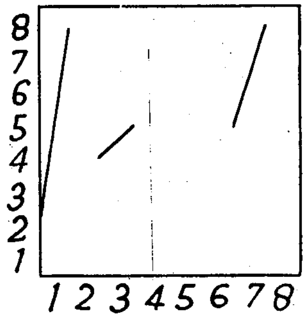
Figure 13:
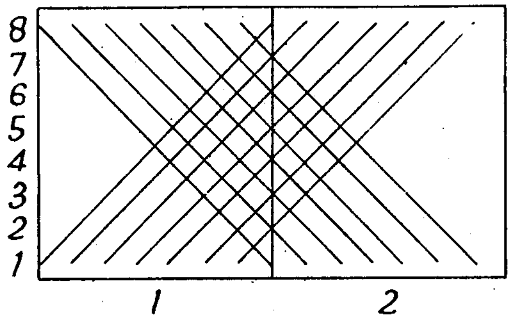
Figure 14:
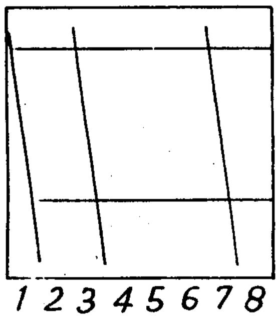
Figure 15:
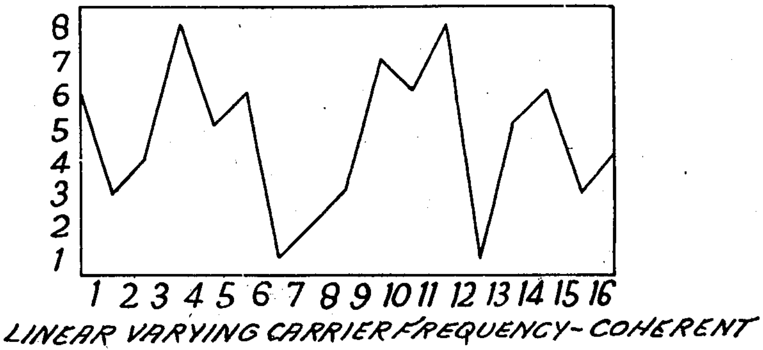
Figure 16:
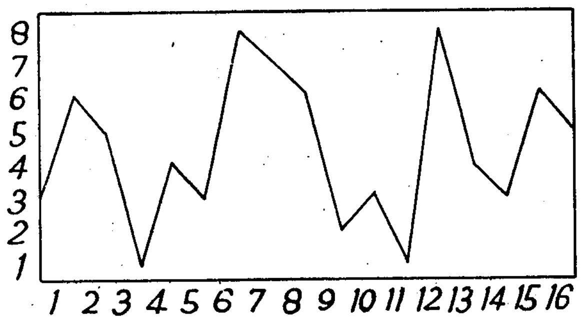
Figure 17:
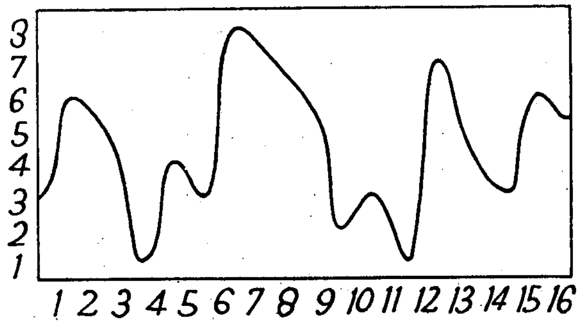
Figure 18:
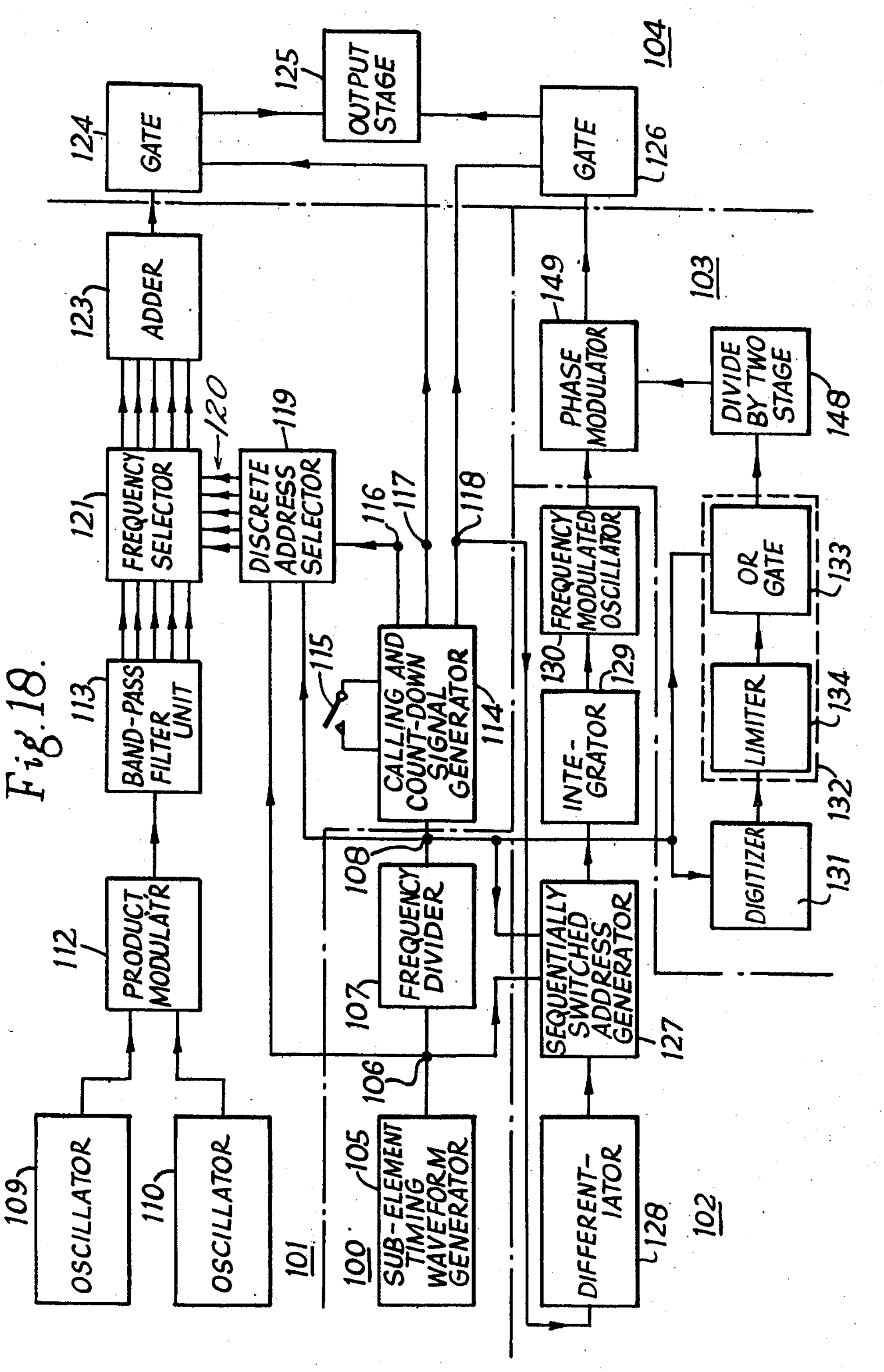
Figure 19:
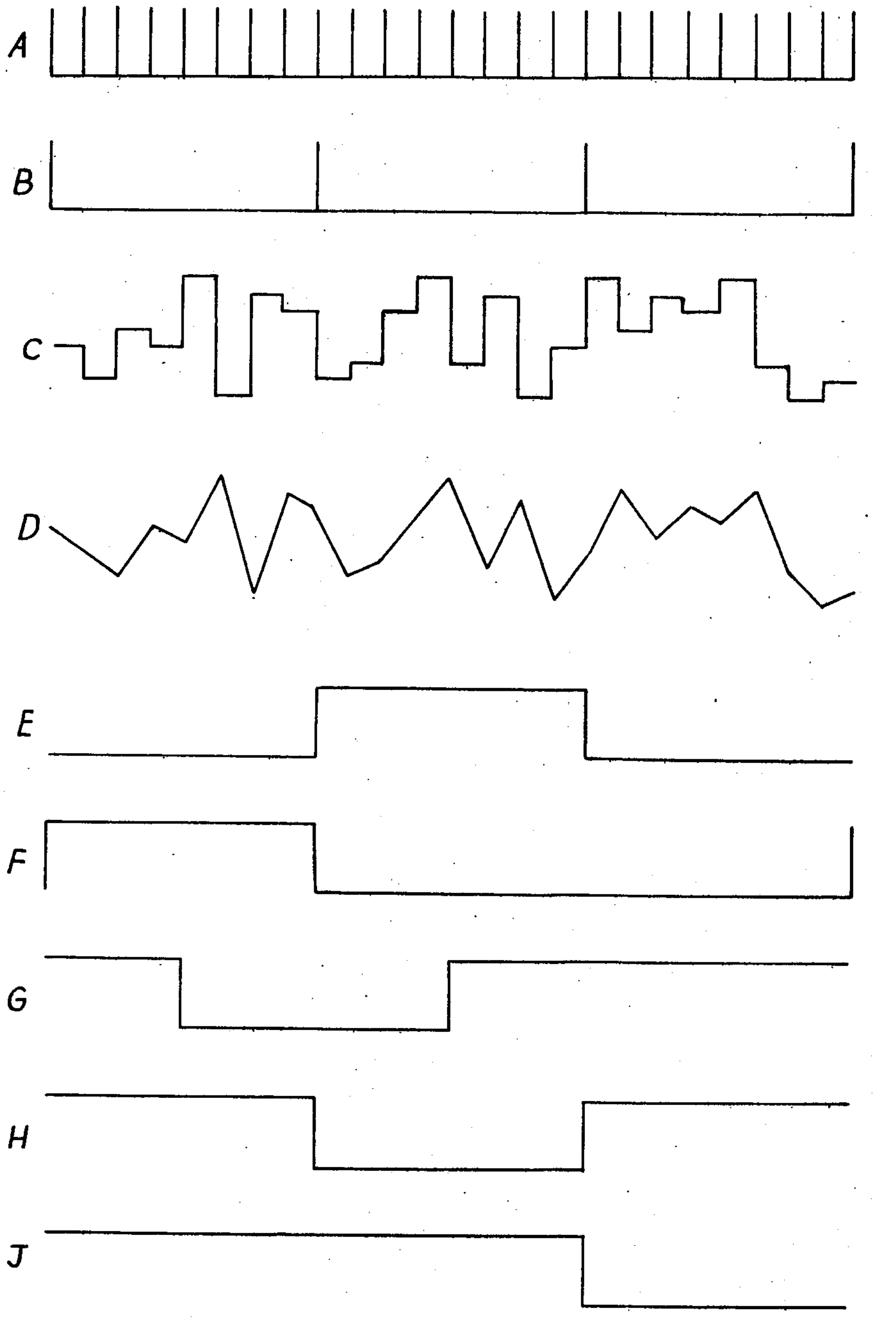
Figure 20:
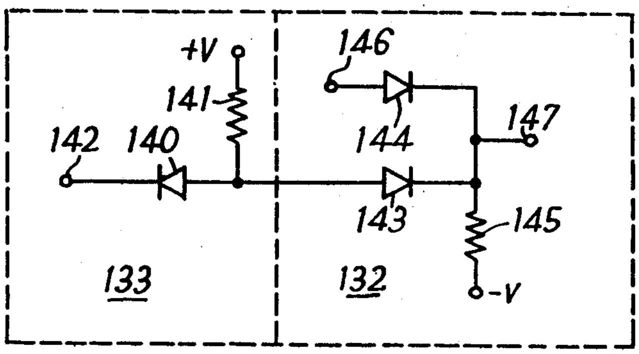
Figure 22:
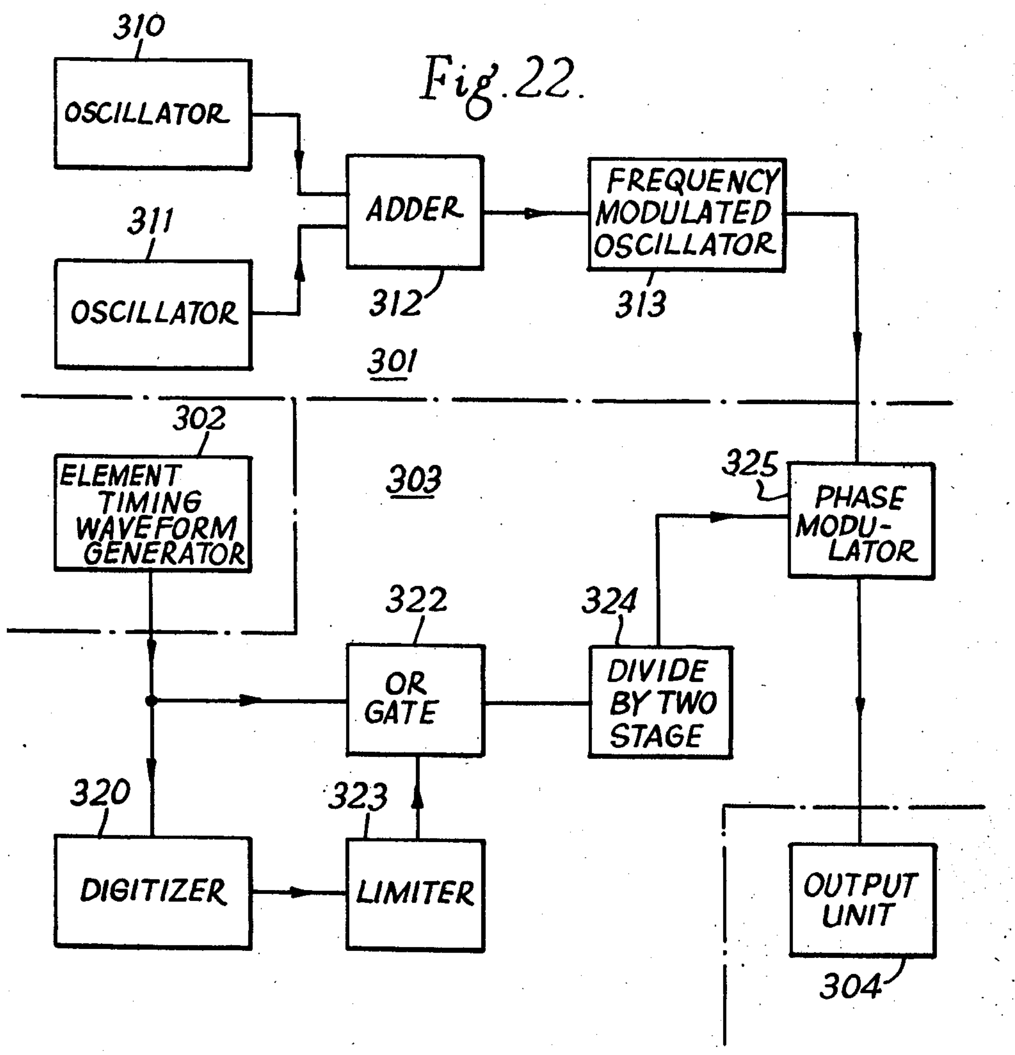
Figure 21:
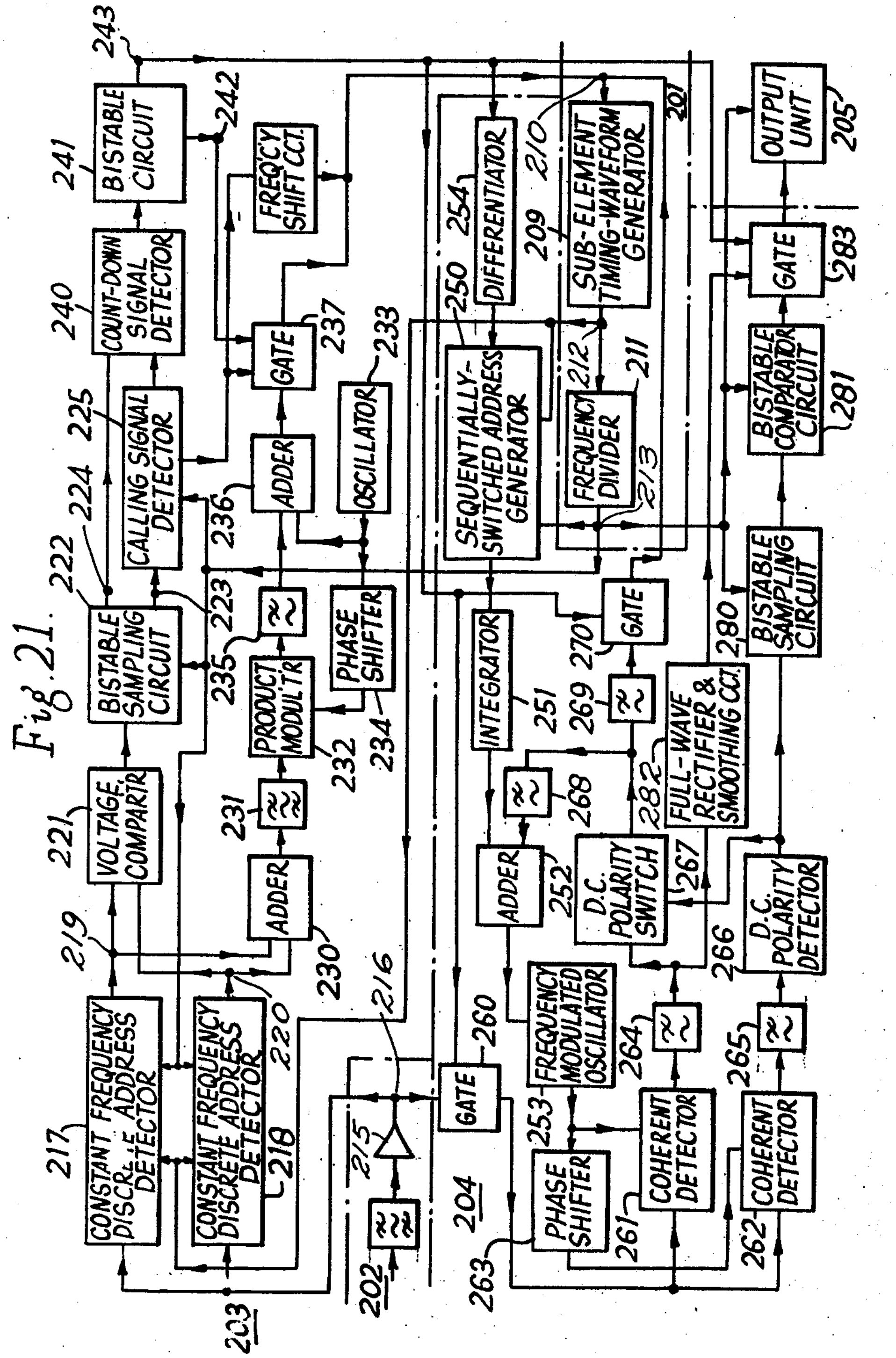
Figure 23:
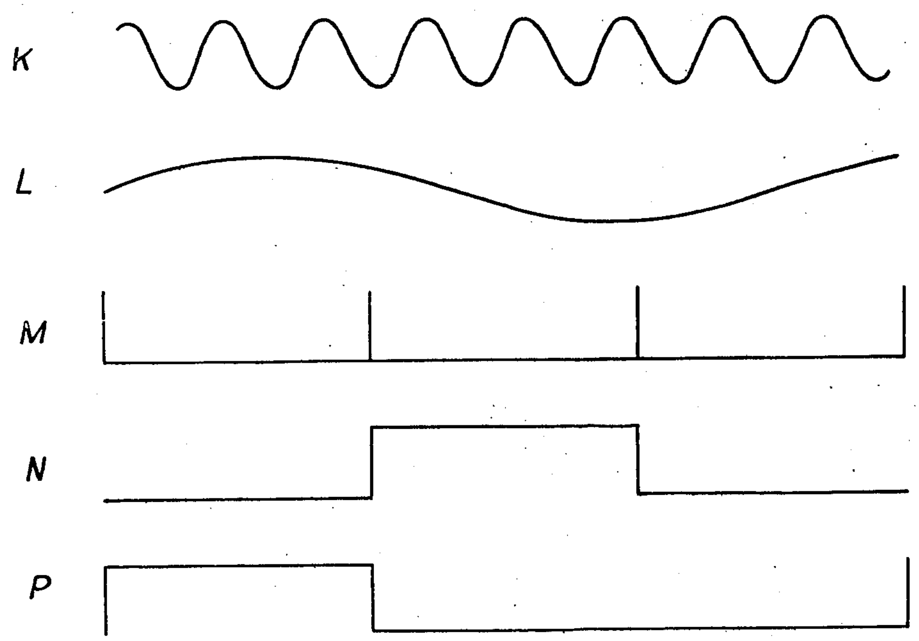
Figure 24:
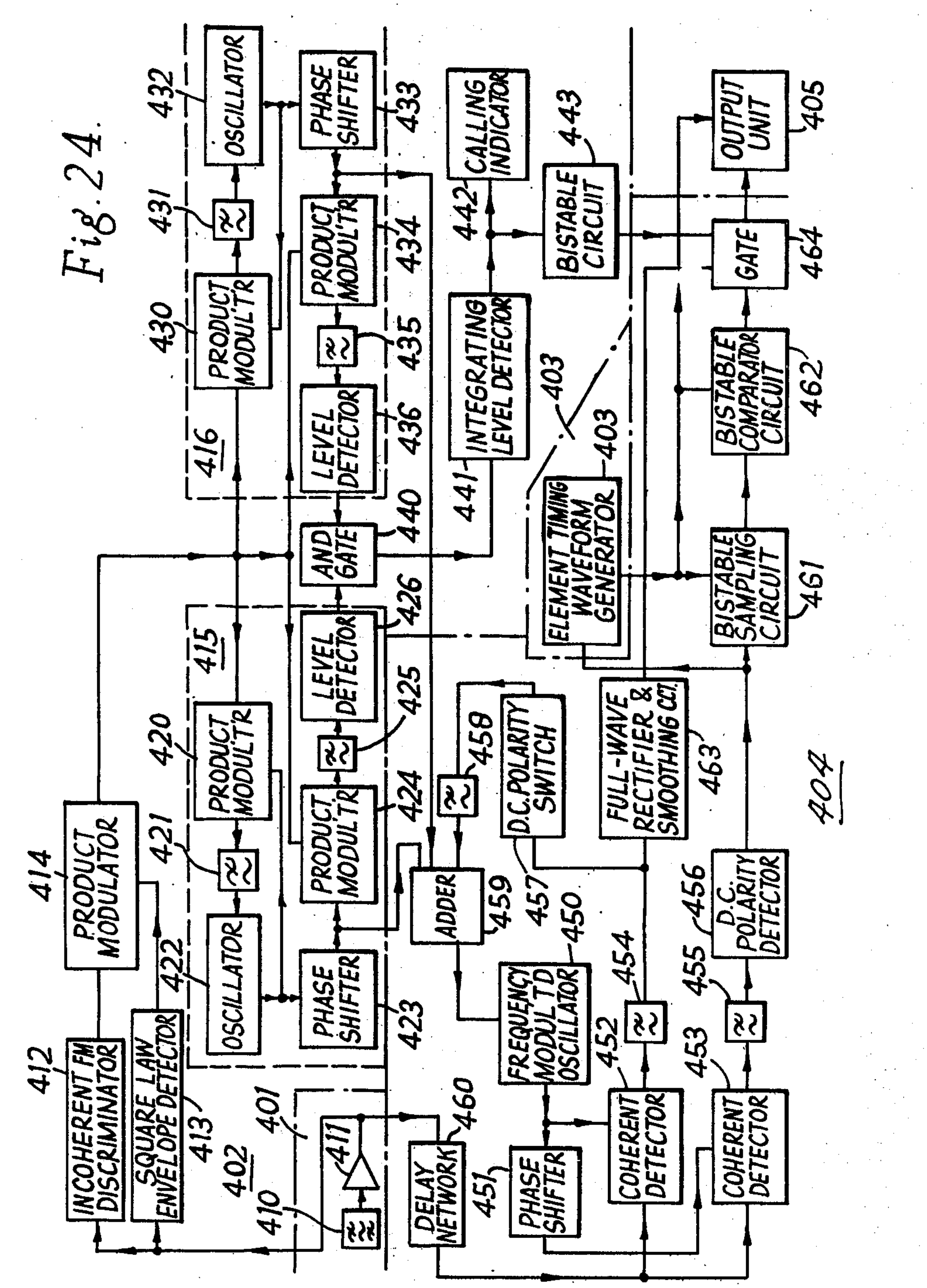
Figure 25:
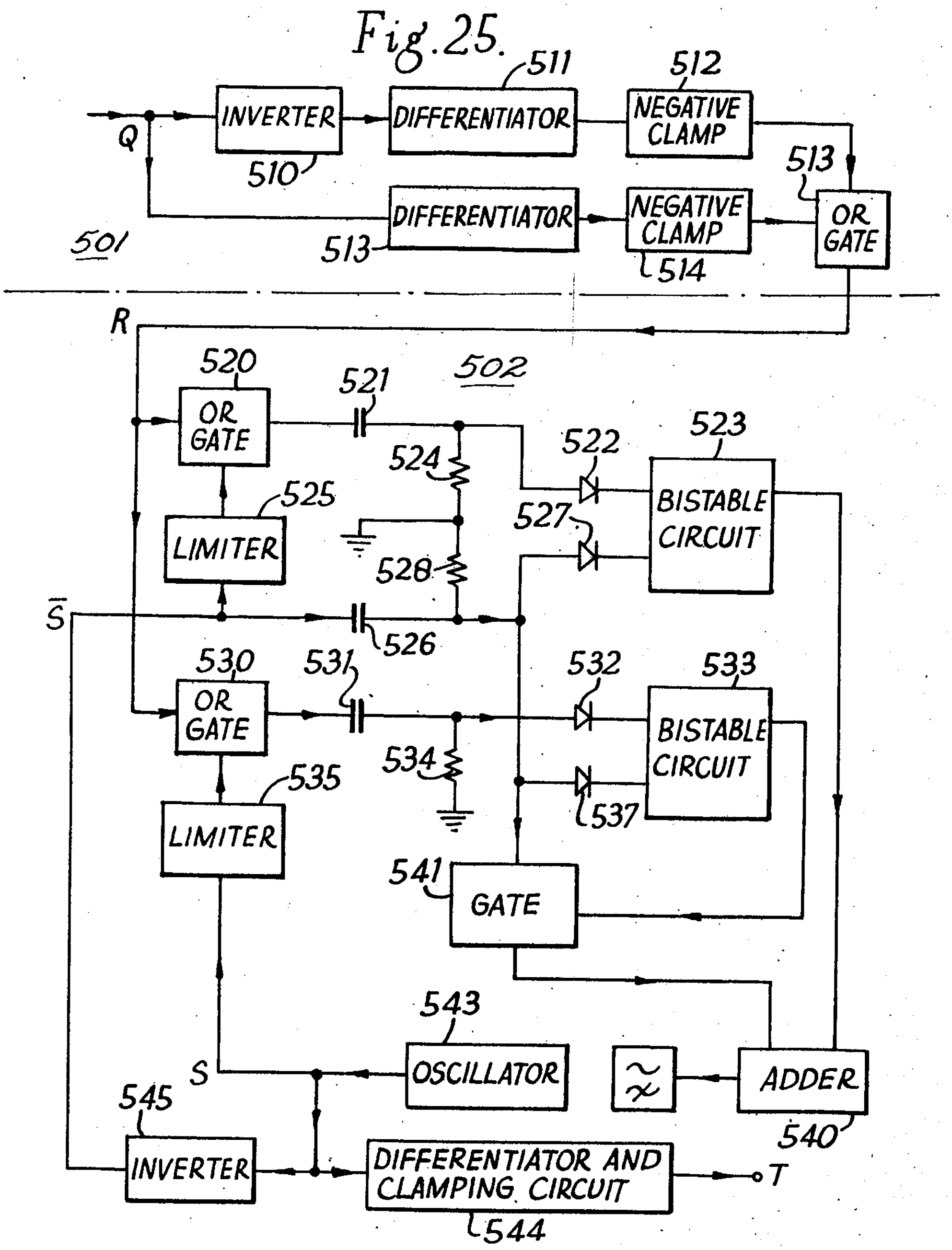

FIGS. 11 and 12 show the frequency-time matrix of a typical digit 1 and the corresponding digit 0 respectively when transmission is by varying carrier-frequency incoherent signals:

FIG. 13 shows two time slots of a frequency-time matrix for a varying carrier-frequency time division multiplex system:

FIG. 14 shows a frequency time matrix representing digit 1 for transmission on a particular address in the varying carrier-frequency time division multiplex system:

FIGS. 15 and 16 show the frequency time matrix for a typical digit 1 and that for the corresponding digit 0 respectively when transmission is by a varying carrier frequency coherent system using a linear varying frequency carrier:

FIG. 17 shows the frequency time matrix for the element shown in FIG. 16 when transmitted using a sin 2 varying frequency carrier:

FIG. 18 is a block schematic diagram of a transmitter according to one embodiment of the invention;

FIG. 19 comprises a number of waveforms illustrating the operation of the embodiment described with reference to FIG. 18;

FIG. 20 is a circuit diagram of one of components of the transmitter illustrated in FIG. 18;

FIG. 21 is a block schematic diagram of a receiver for use with the transmitter shown in FIG. 18;

FIG. 22 is a block schematic diagram of a transmitter according to another embodiment of the invention;

FIG. 23 comprises a number of waveforms illustrating the operation of the embodiment described with reference to FIG. 22;

FIG. 24 is a block schematic diagram of a receiver for use with the transmitter shown in FIG. 22;

FIG. 25 is a block schematic diagram of a timing waveform generator; and

Figure 26:
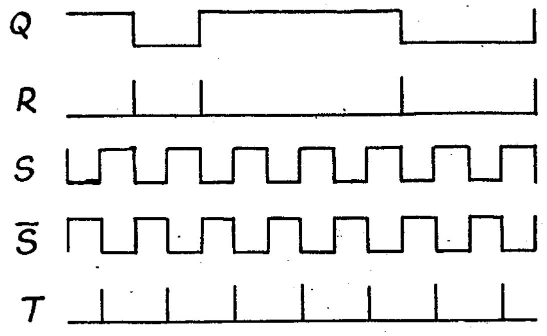

FIG. 26 comprises a number of waveforms illustrating the operation of the timing waveform generator shown in FIG. 25.

Each transmitter and receiver is connected to the common transmission path and a unique address is allocated to each receiver. A transmitter wishing to contact a particular receiver transmits a calling signal using the address of the wanted receiver. The receiver, when not engaged on a call, is set to receive signals using its address. On recognition of the calling signal, which consists of a fixed sequence of 1's and 0's, it locks on to this signal so that synchronous transmission can take place. After a suitable time, transmission of the calling signal ceases and there is transmitted a highly redundant timing signal, which could be a countdown signal such as 6–5–4–3–2–1–0, the redundancy being sufficient for the signal to be recognised under conditions of severe interference. This signal causes the phase of the receiver to be adjusted to line up with the transmitter. When the last frequency-time matrix of the timing signal has been transmitted, both the transmitter and the receiver are switched to the next address in a predetermined sequence, following that on which the receiver was called. After transmission of the next frequency-time matrix, the transmitter and receiver are switched to the next address in the sequence and so on.

The number of different addresses in the sequence would normally be very large and there is no synchronisation between the various transmitters, since the time at which each start switching sequentially is dependent on the time at which the call is initiated. Moreover, the particular point in the sequence at which each transmitter starts is dependent on the receiver which it is calling. Hence the probability of two signals being at the same point in the cycle and approximately in phase with each other is very small indeed. This is on the assumption that all the different addresses in the sequence are used by all transmitters and as mentioned above this need not always be so, in which case the probability of interference is still further reduced. Furthermore, the sequence of addresses in the cycle is so chosen that no two channels separated by any given interval in the sequence have a much greater possibility of interference than average. Since this arrangement is possible, the interference produced in any one channel will be random in nature and will take the form of random noise. Such interference will be apparent as a background hiss or roar and this can be tolerated at a much higher level than can interference of a more coherent nature. If the digital information represents the coding of speech this interference can be appreciable before it interferes seriously with the intelligibility of the conversation.

Various methods of modulation of the carrier signal are suitable for use with the system according to the invention, the preferred method varying with the particular circumstances. The methods can be conveniently divided into two groups: so-called constant carrier-frequency systems wherein the frequency of the signal is substantially constant for the duration of each sub-element, and so-called varying carrier-frequency systems wherein, during the transmission of each sub-element, the frequency of the signal varies in a predetermined manner, preferably linear. In the various examples, an eight frequency band/eight time slot frequency-time matrix is considered.

For constant carrier-frequency systems, the arrangement of signals in the frequency-time matrix is assumed to be that each address comprises a unique combination of a predetermined number of sub-elements, not more than one such sub-element occurring in each time slot. In the case of addresses used for calling, the first time slot of each matrix always contains a sub-element which, in addition to being part of the address, is used to assist in the correct synchronisation of the receiver to the transmitter. This slightly limiting condition is not imposed for the address used in the switching sequence because the receiver here uses its prior knowledge of the phase of each frequency-time matrix to synchronise on one or more of the sub-elements no matter in which time slot they occur.

In the following descriptions of methods of modulating the constant frequency carrier, a three sub-element address is considered by way of example.

Figure 1:
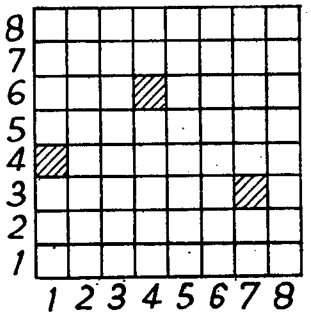
Figure 2:
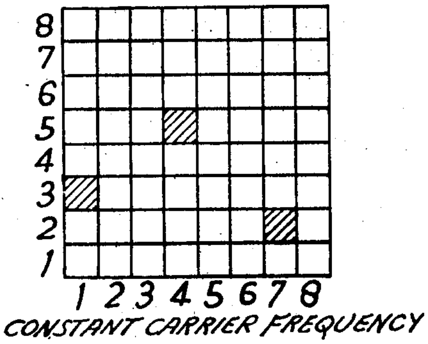

Referring to FIGS. 1 and 2, the former shows by shading the positions in the frequency-time matrix of a typical digit 1 and the latter that of the corresponding digit 0, transmission being by frequency modulation of a constant carrier-frequency signal. In this example the sub-elements of the digit 1 of the address occupy the next higher frequency band in the same time slot. The receiver compares the signal levels in the frequency band associated with digit 1 with that associated with digit 0 separately for each sub-element. The results of this are then compared to see whether the majority of sub-elements indicate digit 1 or digit 0.

In the above example a sub-element representing digit 1 in one address also represents digit 0 in another address having a sub-element in the same time slot and one frequency band higher. In order to cause a false result from this sub-element, the interfering signal will have to be at a higher power level than the original signal, the amount of extra power depending on how nearly coincident the two signals are. This source of possible interference can be reduced by not allowing the higher frequency band of one sub-element to be used as the lower frequency band of another, though this obviously leads to a reduction in the number of addresses available. Conversely, if a higher level of interference is acceptable, the number of addresses can be increased by allowing the corresponding sub-elements representing digits 1 and 0 respectively to occupy any two frequency bands in the same time slot.

Figure 3:
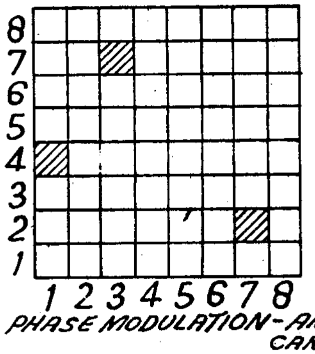
Figure 4:
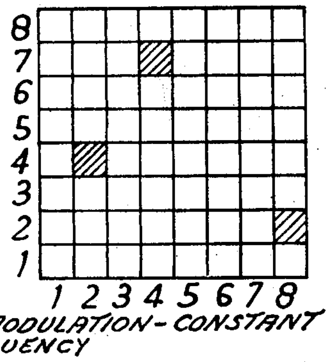

Referring now to FIGS. 3 and 4, the former shows the frequency-time matrix of digit 1 and the latter that of digit 0 for transmission on a particular address by so-called Phase Modulation-Amplitude Modulation. In this system a phase-modulated signal containing one sub-carrier cycle is used to amplitude modulate the transmitter carrier. The sub-elements of digit 0 occupy the next time slot following those occupied by the sub-elements of digit 1 of the same address, both signals being in the same frequency band in each case. Possible confusion between the two digits during the calling period before synchronism has been achieved does not cause trouble since the calling signal consists of a known sequence of 1's and 0's. However, if it is desired to reduce interference at the expense of also reducing the number of addresses, the condition may be imposed that sub-elements representing digit 1 occupy odd numbered time slots, while those representing digit 0 occupy even numbered time slots.

Figure 5:
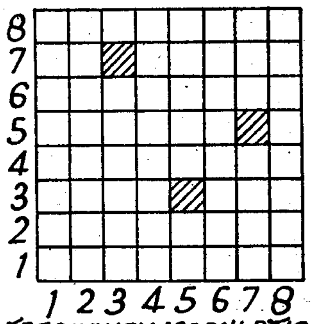
Figure 6:
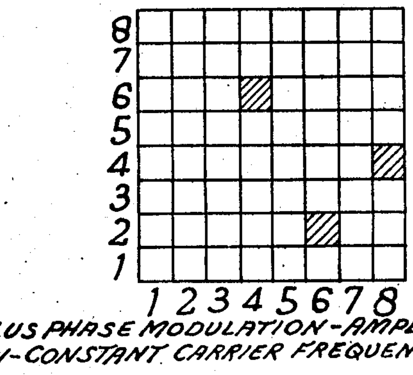

Referring now to FIGS. 5 and 6, the former shows the frequency-time matrix of digit 1 and the latter that of digit 0 for transmission on a particular address by Frequency Modulation plus Phase Modulation-Amplitude Modulation. In this system frequency modulation is applied to the transmitted carrier at the same time as the process of generating a Phase Modulated-Amplitude Modulated signal, the two processes being suitably phased. Each sub-element in the address occupies two adjacent time slots and two adjacent frequency bands, digit 1 occupying the higher frequency band in the earlier time slot and digit 0 the lower in the latter time slot. It will be noted that, in the example illustrated, there is no sub-element in the first time slot. This particular address cannot, therefore, be used as a calling address but only as part of the switching sequence. A much larger number of addresses can be obtained at the expense of an increased probability of interference if each sub-element is permitted to use any two frequency bands and any two time slots for each sub-element, a signal in the earlier time slot representing digit 1 and one in the latter representing digit 0. A compromise arrangement can conveniently be used in which the two time slots of each sub-element are always adjacent and the first time slot of one sub-element is not permitted to coincide with the second time slot of another. The two unit areas of each sub-element can each occupy any frequency band.

Figure 7:
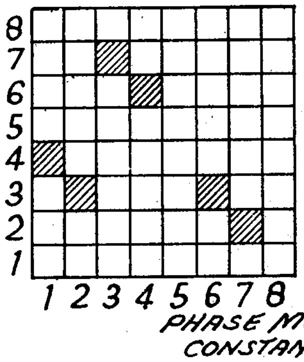
Figure 8:
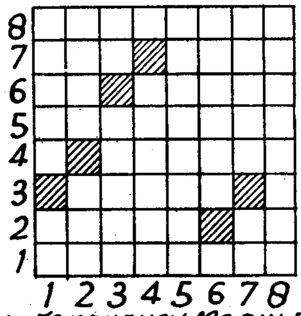

Referring now to FIGS. 7 and 8, the former shows a frequency-time matrix of digit 1 and the latter one of digit 0 for transmission on a particular address by Phase Modulation-Frequency Modulation. In this system, a phase-modulated signal containing one carrier cycle is used in turn to frequency modulate the transmitted carrier. Each sub-element occupies two adjacent time slots and two adjacent frequency bands, digit 1 occupying the higher frequency band in the first time slot and the lower in the second and digit 0 occupying the lower frequency band in the first time slot and the higher in the second. If it is required to obtain a larger number of different addresses at the expense of an increased probability of interference, the following arrangement is used. Each sub-element is permitted to occupy any four unit areas of the frequency-time matrix which satisfy the condition that one sub-element occupies only two different frequency bands and two different time slots.

In practice it may be desirable to make use of the compromise in which the two time slots allocated to each sub-element are always adjacent and the first time slot of one sub-element is not permitted to coincide with the second time slot of another. Each sub-element can however use any two frequency bands.

The modulation methods in the second group, i.e. those used in the so-called varying carrier-frequency systems, can be conveniently sub-divided into so-called incoherent and so-called coherent systems. Whereas in the former there is no phase coherence between the signals of each sub-element, in the latter a coherent signal is transmitted for the duration of each element.

Figure 9:
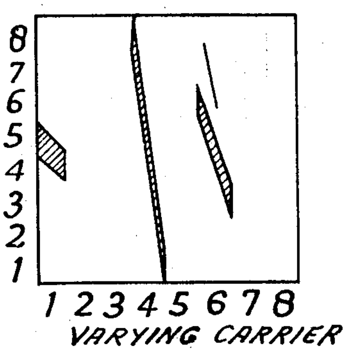
FIG. 9 shows a frequency-time matrix containing three typical varying carrier-frequency incoherent sub-elements.

Referring to FIG. 9, there is shown a frequency-time matrix containing three typical varying carrier frequency incoherent sub-elements. It can be seen that for all three, both the instantaneous bandwidth and the total area occupied by each sub-element is the same as for a constant carrier-frequency sub-element. However, the probability of a few signals causing high level interference is lower for a varying carrier-frequency signal than for the equivalent constant carrier-frequency signal since, in order for interference to occur, coincidence of rate of change of frequency is needed as well as of frequency, and this probability decreases as the number of frequency bands occupied by the sub-element increases. Thus, one of the three sub-elements shown, that in time slot 4 will be least susceptible to such high-level interference. In later drawings varying carrier-frequency sub-elements will be represented for convenience by single lines indicating the instantaneous carrier-frequency at any time, but it should be understood that at any instant in time each signal in fact occupies a bandwidth equal to one frequency band. As with constant carrier-frequency systems, the allocated addresses used for calling all contain a sub-element in the first time slot of the frequency-time matrix.

Figure 10:
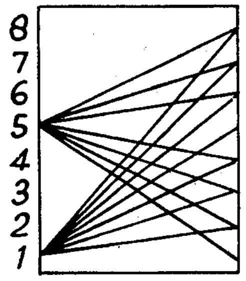
FIG. 10 shows a single time slot in a frequency-time matrix showing all the possible varying carrier-frequency signals whose starting frequency is either band 1 or band 5.

Referring now to FIGS. 10, 11 and 12, the first shows a single time slot of a frequency-time matrix for the so-called Frequency Division Multiplex system. The example shows all the possible varying carrier-frequency signals whose starting frequency band is either band 1 or band 5, those whose starting frequency is in any of the other six bands being omitted for the sake of clarity. Of FIGS. 11 and 12, the former shows the frequency-time matrix of digit 1 and the latter that of digit 0 for transmission on a typical 3 sub-element address using this system. As can be seen, digit 1 is represented by signals having decreasing frequency and digit 0 by the corresponding signals having increasing frequency.

Referring now to FIG. 13, this shows two time slots of a frequency-time matrix for the so-called Time Division Multiplex system. The example shows all the possible varying carrier-frequency sub-element signals of a given basic form and starting in the same time slot. Each sub-element occupies all 8 frequency bands and has a duration equal to that of one time slot. There may be overlapping in time between the sub-elements of an address. As can be seen although the spacing in time between adjacent sub-elements is 1/7 of a time slot, there is a constant frequency difference of one bandwidth between adjacent sub-elements. The receiver may therefore isolate each sub-element with negligible interference from the other sub-elements. As before, signals of decreasing frequency are used to represent digit 1 and those of increasing frequency to represent digit 0.

Referring to FIG. 14, there is shown a frequency-time matrix representing digit 1 for transmission on a particular address by the Time Division Multiplex system just described. Each sub-element occupies the whole eight frequency bands, as before, but in this particular example there is no overlapping in time between sub-elements, each one occupying a separate time slot. This arrangement has a very large tolerance to interference from narrow band constant-frequency signals. The system can be used over a given frequency band simultaneously with a number of these constant-frequency signals. In FIG. 14, two such signals are shown occupying parts of bands 3 and 7. It will be realised that a considerably greater number of such signals could be transmitted in the part of the spectrum shown.

Where it is desired to obtain a very large number of channels, an arrangement combining the Frequency Division Multiplex and Time Division Multiplex systems could be used. However, such an arrangement would require very complex equipment.

Referring now to FIGS. 15 and 16, the former shows the frequency-time matrix of digit 1 and the latter that of digit 0 for transmission on a particular address using the varying carrier-frequency coherent system. In this example an eight frequency band/sixteen time slot frequency-time matrix is used and a signal is transmitted continuously. Within each matrix every sub-element except the first starts at the same frequency as that at which the preceding sub-element finished. Between each matrix there is a gap approximately equal to one time slot, during which there is transmitted a link signal the initial frequency of which is the final frequency of the preceding matrix and the final frequency of which is the initial frequency of the subsequent matrix. The signal can therefore be arranged to have no discontinuities in frequency or phase, thus considerably reducing the instantaneous frequency bandwidth it occupies.

When a linear varying-frequency carrier is used the width of the frequency band occupied by a channel is relatively wide since the waveform is triangular. The necessary bandwidth can be reduced if a a $\sin^2$ varying frequency carrier is used. The frequency-time matrix for the element shown in FIG. 16, when transmitted on this system, is illustrated in FIG. 17.

With the varying-frequency coherent system, instead of using separate addresses for the digit 1 and the digit 0, a distinction can be made by applying a 180° phase shift in the case of one digit and no phase shift in the case of the other. Such a signal can be detected in a receiver by multiplying it with a reference signal having the same instantaneous frequency as that of a carrier signal on the address to be received and the same phase as signal representing one of the digits. Thus, the required signal is either in phase or in anti-phase with the reference carrier. If the signal to be transmitted and the reference carrier in the receiver are passed through filters having the same characteristics, compensation for signal distortion due to band limiting is obtained.

The varying carrier-frequency coherent system has the possible disadvantage that it requires a transmission path which does not introduce significant phase variations in the transmitted signal carrier over the duration of any signal element. It has however the great advantage over all other modulation methods described here that because of the much smaller effective bandwidth of its signals, the level of inter-channel interference between any two channels is normally very much lower than with the other systems. As a result of this, it permits a considerably larger number of different channels to be used simultaneously.

Another disadvantage of the varying carrier-frequency coherent system is the length of time which must be allowed for a receiver to achieve synchronization with a transmitter which is sending a calling signal on its address. Before the receiver can even recognize the presence of the calling signal, the receiver must be fairly accurately synchronized to the transmitted signal. A considerable time, during which the calling signal is transmitted must be allowed for this if the frequency of the receiver is arranged to drift at a sufficiently slow rate for detection of the calling signal to take place. This disadvantage is, of course, increased as the selectiveness of the receiver is increased.

This disadvantage can be overcome by arranging that, in the unique address allocated to any receiver for use when setting up a connection, the initial and final values of the instantaneous carrier-frequency are the same and unaffected by whether the frequency-time matrix represents the digit 1 or 0, the link signal between adjacent matrices can be arranged to have a constant carrier-frequency. With such an arrangement the synchronization of the receiver to the incoming signal when it first receives a call can be achieved in two stages: first an approximate phase-lock on to the constant carrier-frequency link signals and then an accurate phase-lock on to the varying carrier-frequency signals themselves. This arrangement considerably reduces the difficulties involved in achieving synchronization where very narrow effective frequency bandwidths are used by the incoming signal, as in the varying carrier-frequency coherent system. However, it reduces the total number of available discrete addresses.

Alternatively, this disadvantage can be overcome by using a different system for transmitting the calling signal. A much higher level of interference can be tolerated at this stage than when information signals are being transmitted since the calling signal is repeated several times. Moreover, a comparatively small number of connections will be in the process of being set up at any one time. It is preferable for the count-down signal to be transmitted on the same system as the calling signal rather than on the first varying carrier frequency address.

According to one embodiment of the invention, a linear varying-frequency phase-modulated signal is used and the sequential switching of addresses is achieved digitally on an element-by-element basis. The use of filters having the same characteristics in the transmitter and in the receiver allows the frequency bandwidth occupied by the signal to be limited without substantial distortion of the received signal. A constant frequency system is used for transmitting the calling signal.

Referring to FIG. 18 a transmitter for the use with this embodiment comprises a timing waveform unit 100*a*, calling signal unit 101, an address generating unit 102, an information signal modulating unit 103 and an output unit 104.

The timing waveform unit 100 includes a sub-element timing waveform generator 105 containing an oscillator whose output on terminal 106 is a waveform A (FIG. 19) comprising narrow positive-going pulses. The sub-element timing waveform A is fed to a frequency divider 107 where it is frequency divided by a number equal to the number of sub-elements per signal element, to produce an element timing waveform B (FIG. 19) at terminal 108.

The calling signal unit 101 comprises an oscillator 109, arranged to generate a sine wave of frequency $f_c$ c./s., and an oscillator 110 arranged to generate a square wave which has a fundamental frequency $f_m$ c./s. equal to half the frequency difference between any two adjacent values of the transmitted carrier frequency. The frequency $f_c$ c./s. is equal to the centre frequency of the spectrum of the transmitted signal and therefore is in general a very much higher frequency than $f_m$ c./s. The $f_m$ c./s. square-wave contains a range of frequency components whose values are given by $(2n-1)\ f_m$ c./s., where $n$ is a positive integer. The outputs of the oscillators 109 and 110 are connected to the inputs of a product modulator (suppressed carrier amplitude modulator) 112, the output of which is therefore a range of frequencies whose values are given by the expression $(f_c \pm (2n-1) f_m)$ c./s. The output of the product modulator 112 is connected to the output of a bandpass filter unit 113, the various filters of which isolate components of the output from the product modulator 112. Separate amplifiers for each filter in the unit 113 are arranged to adjust the levels of the different isolated frequencies, so that these are all the same. In the absence of such adjustment, the voltage level of each harmonic component of the square-wave signal from the product modulator 112 at the output of the filter unit 113, would be inversely proportional to the order of the harmonic.

The calling signal unit 101 also includes a calling signal and count-down signal generator 114 with three output terminals 116, 117 and 118. The operation of this circuit is controlled by a transmission switch 115 which is held closed throughout the duration of a call and is otherwise open. So long as the transmission switch is open there is a steady negative voltage at each of the terminals 116, 117 and 118. When the transmission switch is first closed, a signal shot timing circuit is switched on, which causes first the calling signal and then the count-down signal to be fed to the terminal 116. The calling signal is a square wave with the alternate positive and negative transition synchronized to the successive positive pulses in the element timing waveform. A positive level represents an element 0 and a negative level represents an element 1. The calling signal is thus a stream of elements which are alternatively 0 and 1. After the calling signal has been transmitted for a predetermined time, the calling signal and count-down signal generator 114 transmits the count-down signal which consists of a predetermined series of binary numbers. While these signals are being transmitted a positive voltage appears at the terminal 117 the voltage at 118 remaining negative.

The calling signal unit 101 also includes a discrete address selector 119, having a plurality of output terminals 120 and controlled by a manual keyboard onto which is typed the address of the called subscriber before the transmission switch is closed to initiate the call. Inputs to the discrete address selector are connected to terminals 106 and 108 whereby its output is synchronised to the element and sub-element timing waveforms, B and A. During an element for which the waveform at the terminal 116 is positive, the discrete address selector selects the address corresponding to element 0 and during an element for which the waveform at the terminal 116 is negative it selects the address corresponding to an element 1. The calling signal is transmitted as a frequency-modulated signal and therefore for each called subscriber, the calling address for an element 0 occupies the same time-slots in the frequency-time matrix as that for an element 1, but in each of the time-slots occupied, an element 0 is transmitted on a different frequency from that used for an element 1. The addresses for both elements are fixed for any one subscriber and are different to those used for any other subscriber. Thus a unique pair of addresses is used for each subscriber.

In one arrangement, the operation of the manual keyboard associated with the discrete-address selector 119, is such that the user selects in turn a decimal digit for each time-slot in the frequency-time matrix. The value of the decimal digit chosen for each time-slot, represents the constant frequency allocated to that sub-element. A decimal digit 0 represents no frequency to be transmitted in that time-slot. Each decimal digit when typed into the discrete-address selector is coded into a binary number having $p$ elements, where $p$ is the number of frequency-bands in the frequency-time matrix. Each binary number, except for that corresponding to the decimal digit 0 has exactly one binary 0, represented by a positive voltage level, and $(p-1)$ binary 1's each represented by a negative level. The decimal digit 0 is represented by a binary number comprising all 1's. Thus each binary-coded number is distinguished from the other by the position of the element 0. As it is typed into the discrete address selector 119, each binary-coded number is stored in a separate binary store having $p$ storage elements.

Associated with the binary stores there is a counter which is reset to a position "one" at the arrival of each positive pulse in the element-timing waveform. When in position "one," the counter causes each storage element of the first number typed into the store to be connected to a corresponding one of the output terminals 120 of the discrete-address selector 119, these connections remaining for the duration of the first sub-element. The connections are made via gates which are controlled by the counter.

When the next positive pulse in the sub-element timing waveform arrives, this causes the counter to be switched to position "two." The counter now sets the connecting gates so that each storage is connected to the corresponding output terminal of the discrete address selector. Similarly the next positive pulse in the sub-element timing waveform causes the third binary-coded number to be connected to the output terminals, and so on.

Since different addresses are used for the elements 0 and 1 two different binary-coded numbers are in fact extracted from the $p$ element stores for every decimal digit used. During any one element, depending on whether the signal at terminal 116 represents a 0 or a 1, the appropriate one of each pair of $p$-element stores associated with every decimal digit typed into the store, is made available for connection to the output terminals, the other $p$-element store being temporarily disconnected. Thus over the duration of every signal element, depending on whether the element represents a 0 or a 1, the appropriate unique sequence of sub-elements signals is produced at the output terminals 120 of the discrete address selector 119.

The output terminals 120 are connected to a frequency selector 121 which contains a plurality of gates, each of which is connected to one of the terminals 120 and to a particular input carrier frequency received from the band pass filters and amplifiers 113. So long as the gating control signal fed from the discrete address selector 119 along any connection to the frequency selector 121, is negative and so represents a 1, the corresponding gate is closed and prevents the passage of the respective carrier frequency to the output of the frequency selector 121. During the period when the gating control signal is positive and so represents 0, the corresponding gate is open and permits the passage of the associated carrier frequency through to one of a plurality of output terminals 122 of the frequency selector 121. The output terminals 122 are all connected to an adder 123, in which the signals from the different output terminals 122 are added together.

With the arrangement just described the effect of band limiting each frequency is to convert the rectangular envelope of the gated carrier into a corresponding $\sin^2$ envelope. This of course results in a lengthening of the overall duration of any pulse, so that two different frequencies transmitted in adjacent time-slots will result in an overlap in time of the two different carrier frequencies. This is not a disadvantage so long as the range of the levels of the different received signals at any one receiver, is relatively small. However, when an appreciable range of received signal levels may be experienced, the low level signal may suffer excessive inter-channel interference from a high-level interfering signal which has the same frequency and an immediately adjacent time slot. This interference can be reduced by ensuring that the duration of a positive signal from the discrete address selector 119, and hence that of the gated carrier, is limited to the central portion of the sub-element period. In addition, the frequency difference between adjacent values of the transmitted carrier-frequency may be correspondingly increased, in order to allow for the wider frequency-band occupied by the shorter transmitted signal pulse. These precautions prevent a sub-element of the high-level interfering signal from ocuupying more than one time-slot in the wanted signal.

When the frequency-time matrix has a large number of separate frequency-bands, the arrangement just described would involve a large number of storage elements. An alternative arrangement, which requires fewer storage elements is to arrange for the discrete-address selector to generate a binary number whose value is equal to that of the corresponding decimal digit and each of whose binary digits is allocated to a different output terminal (connection of the frequency selector). One such binary number is generated for each time slot. Each of the different binary numbers corresponds to a different constant frequency in the transmitted signal. The gating circuits in the frequency selector 121 are so arranged that each of the different binary numbers holds open a gate for the corresponding constant frequency. Under these conditions, for example, with 16 separate frequency-bands in the frequency-time matrix each of the different stores containing $p$ storage elements, in the discrete-address selector 119, now require only 5 instead of 16 storage elements. Thus, although more complex gating circuits are needed for selecting the correct frequency in the frequency selector, this is more than offset by the considerable reduction in the total number of storage elements in the discrete address selector.

During generation of the calling signal and the count-down signal, a positive voltage appears at the terminal 117 of the calling and count-down signal generator 114 and this holds open a gate 124 in the output unit 104, thus allowing the output signal from the adder 123 to be fed to the carrier transmitter output stage 125.

If the transmission medium is a telephone line, the output from the stage 124 can be fed directly on to the line. On the other hand, if a radio link is used, the output from the stage 125 is fed to a further stage which performs the necessary functions of frequency multiplication and translation, before the signals are fed to the aerial.

The address generating unit 102 includes a sequentially-switched address generator 127, which comprises a plurality of binary pseudo-random-number generators, the outputs of which are added together to produce the output of the address generator 127. Preferably, the address generator 127 comprises one fewer of such pseudo-random-number generators than there are frequency bands in the frequency time matrix to be used. The output of the address generator comprises one of a number of evenly spaced D.C. voltages each of which represents one of the frequency bands of the frequency time matrix. The address generator 127 is so designed that it selects sequentially all the different element waveforms which satisfy the condition that no one sub-element has the same voltage as one of its immediate neighbors.

The sequentially-switched address generator 127 has two timing inputs connected to the terminals 106 and 108 and a "reset" input connected to the output of a differentiator 128, the input of which is connected to the terminal 118 of the calling signal and count-down signal generator 114. The output of the address generator 127 is connected to the input of an integrator 129, the output of which is used to frequency modulate the signal produced by an oscillator 130 having the same natural frequency as the oscillator 109.

In operation, immediately after the last element in the count-down signal has been transmitted, the voltage at the terminal 117 goes negative, switching off the gate 124 and so preventing any further constant-frequency signals from being transmitted. At the same time the voltage at the terminal 118 goes positive, switching on a gate 126 in the output unit 104 which connects the output from the information signal modulating unit 104 to the output stage 125. At the same time the output signal from the differentiator 128, comprising a short positive-going pulse resets the sequentially-switched address generator to the output D.C. voltage level corresponding to the first sub-element in the first address of its sequence. The short positive-going pulse from the differentiator is arranged to coincide with the beginning of the element following the last element of the count-down signal.

At the next positive pulse in the sub-element timing-waveform, which is fed to the sequentially-switched address generator via the terminal 106, the D.C. voltage at the output of the latter circuit changes to its next value, where it remains until the next positive pulse and so on, producing an output waveform C (FIG. 19).

The output waveform C from the sequentially-switched address generator is fed to the integrator which produces an output waveform D (FIG. 19). This waveform can be regarded as that obtained from the waveform C by joining the signal voltage at the end of each sub-element to that at the end of the next, using a straight line. Using known circuit techniques, the waveform D can be produced with a shape which corresponds very accurately to that required and will furthermore be subject to negligible drift.

As previously described, the output of the integrator 129 is fed as the modulating waveform to the frequency-modulated oscillator 130. The output waveform of the oscillator 130 has the frequency-time trace required for the transmitted signal and has a waveform similar to the waveform D.

The information signal modulating unit 103 includes a digitizer 131 arranged to receive information signals and to convert them into a binary digital code. The digitizer 131 has an input connected to the terminal 108 and the elements of the digital code signal are arranged to be synchronized with the element timing waveform received at this input.

The digital output from the digitizer 131 (waveform E, FIG. 19) is connected to one input of a two-input gating unit 132 consisting essentially of an OR gate 133 and a limiter 134 which is a device similar to an AND gate, but having only one input. The output of the limiter 134 is connected to one of the inputs of the OR gate. The other input of the OR gate 133, which forms the second input of the gating unit 132, is connected to the terminal 108. The output of the OR gate 133 forms the output of the gating unit 132.

Referring to FIG. 20, the limiter 134 comprises a diode 140 having a resistor 141 connected to the anode thereof. A source of positive biasing potential +V is connected to the other end of the resistor 141. An input terminal 142 is connected to the cathode of the diode 140.

The OR gate 133 comprises two diodes 143 and 144, the cathodes of which are connected via a resistor 145 to a source of negative biasing potential −V. The anode of the diode 143 is connected to the anode of the diode 140 and the anode of the diode 144 is connected to an input terminal 146. The cathodes of the diodes 143 and 144 are also connected to an output terminal 147.

The gating unit 132 operates as follows. As illustrated in FIG. 19, the element timing waveform B at the terminal 108 consists of a series of positive pulses. It will be assumed by way of example that the digitizer 130 produces a positive output signal to represent the digit 0 and a negative output signal to represent the digit 1.

When there is an element 1 in the binary coded output from the digitizer 131, the resulting negative input to the terminal 142 produces a negative voltage on the anode of the diode 143 but this is blocked at the diode 143 and therefore has no effect on the output terminal 147. Under these conditions, the positive pulses of the element timing waveform, which are applied to the input terminal 146, pass through the diode 144 to the output terminal 147.

When there is an element 0 in the binary coded output from the digitizer 131, the resulting positive input to the terminal 142 produces a positive voltage on the anode of the diode 140. This voltage causes a current to flow in the diode 143 and produces a positive voltage on the output terminal 147. Under these conditions, the positive pulse has no effect on the output terminal.

The delay introduced by the limiter 134 ensures that, when the binary-coded signal changes from an element 1 to an element 0, the voltage on the anode of the diode 143 does not begin to rise until after the whole of the rising edge of the element timing waveform has been received. The presence of the limiter 134 in the path of the binary-coded speech signals also limits the available output current during the positive-going transitions in the waveform on the anode of the diode 143 and so prevents them from having as steep a voltage rise as the pulses on the terminal 146.

The output from the gating device 132 is connected to the input of a "divide by 2" stage 148. This stage is arranged to change state on receipt of a sharply rising positive signal such as those produced on the diode 143 by the element timing waveform but not to change state on receipt of the more slowly rising positive signal such as those produced on the diode 143 by transitions of the binary coded signal from element 1 to element 0. Thus the "divide by 2" state 148 recodes the binary speech signals into a form where the digit 1 is represented by a change in level and the digit 0 by no change in level giving a signal having a waveform such as the waveform F (FIG. 19).

The information signal modulating unit 103 also includes a phase modulator 149 which is arranged with its carrier signal input connected to the output of the oscillator 130 and its modulating input connected to the output of the "divide by 2" stage 148. When the output is positive the varying-frequency carrier passes unchanged through the phase modulator, and when it is negative, the phase of the varying-frequency carrier is shifted by 180°. Thus the phase modulator 149 is a combination of an inverter and gate circuit, whose output signal is the same as the carrier input when the modulating input is positive, and inverted with respect to the input when the modulating input is negative. For each element phase of the output of the phase modulator 149 changes from that for the previous element when the former represents the digit 1 and remains the same when it represents the digit 0.

The output from the phase modulator 149 is the output of the information signal modulating unit 103, and as stated above, this is connected to the input of the gate 126. As previously stated when the transmitter changes from constant-frequency discrete-address operation to from constant-frequency discrete-address operation to varying-frequency sequentially-switched-address operation, the voltage at the terminal 118 goes positive. The varying-frequency signals from the output of the phase modulator 149 are passed through the gate 126 to the output stage 125 and are transmitted over the common communication link.

Referring to FIG. 21, a receiver for use with the transmitter illustrated in FIG. 18 comprises a timing waveform unit 201, an input unit 202, a calling signal detecting unit 203, an information signal detecting unit 204, and an output unit 205.

The timing waveform unit 201 comprises an oscillator 209 having a control terminal 210 and a frequency divider 211, corresponding to the oscillator 105 and the frequency divider 107 of the timing waveform unit 100 of the transmitter. The output of the oscillator, on terminal 212 is the waveform A (FIG. 19) and that of the frequency divider, on terminal 213 is the element timing waveform B (FIG. 19). Application of a signal to the terminal 210 of the oscillator causes the output frequency to alter, as will be described more fully hereinafter.

The receiver input stage 202 comprises a band-pass filter 214, which passes only the frequency band covered by the frequency-time matrix used, and an automatic gain-controlled amplifier 215. The input stage 202 is also provided with an output terminal 216.

One of the requirements of the automatic-gain-controlled amplifier 215 is that the level of any one of the constant or varying frequency signals at the terminal 216, should be affected to as small an extent as possible by the number and levels of the other signals present.

When a number of transmitters are grouped together at a common transmitting station, the signal level at the output of the automatic-gain-controlled amplifier can be controlled by using a separate transmitter to transmit a special constant-frequency pilot signal using a frequency that is not allocated to any of the constant-frequency discrete-address signals and that is preferably outside the frequency band occupied by the varying-frequency signals. The transmitted level of this signal should be adjusted so that its value at any particular receiver is as near as possible to the mean level of the different received signals.

The automatic-gain-controlled amplifier 215 in each receiver isolates and detects the constant-frequency pilot signal, using a long detection period. The level of the detected signal is now used to control the gain of the automatic-gain-controlled amplifier. In order to prevent possible overloading at the output of the amplifier when a large number of relatively high level signals is being received, the overload point of the amplifier must be very many times greater than the typical peak level of any one received signal.

When the transmission medium is a radio link additional operations of frequency division and translation must normally also be carried out on the received signal at the receiver input stage, in order to reduce the carrier frequencies.

The calling signal detecting unit 203 includes two constant-frequency discrete-address detectors 217 and 218, the inputs of which are connected to the terminal 216. One detector 217 is arranged to detect the digit 0 and the other 218 is arranged to detect the digit 1.

The two discrete-address detectors 217 and 218 each comprise a plurality of so-called matched-filter detectors and in each detector, there are as many matched-filter detectors as there are sub-elements in the particular discrete address of the receiver and each of the different matched-filter detectors is arranged to detect a corresponding sub-element. Timing inputs of each discrete address detector are connected to the terminals 212 and 213, whereby the sub-element and element timing waveforms are arranged to operate a system of counters and gates which serve to connect the appropriate matched-filter detectors to the terminal 216 during each sub-element. Thus, each matched filter detector examines the frequency band and time slot allocated to the corresponding sub-element that is, its unit area in the frequency-time matrix. The output of each detector is connected, via a D.C. coupled buffer amplifier to a capacitor whose voltage is dragged to a positive value equal in magnitude to the peak carrier voltage obtained at the output of the matched-filter detector at the end of the sub-element detection period. Immediately following the time slot allocated to this sub-element, the output of the D.C. coupled buffer amplifier is disconnected from the capacitor, which, now being connected only to very high resistance circuits, maintains the voltage level to which it was set. At the same time the matched-filter detector is itself reset, with the input and output terminals both clamped to zero volts, and it is held in this condition until the arrival of its time slot in the next element. The input and output terminals of the matched-filter detector are now released and the following D.C. coupled buffer amplifier is reconnected to the capacitor, so that the detector process for the sub-element is repeated as before, and so on. The D.C. coupled buffer amplifier is so designed that it can provide at its output a large positive or negative current, so that it can rapidly change the voltage across the following capacitor in a positive or negative direction. The clamping and unclamping of each matched filter detector, and the performance of the other operations mentioned for each discrete-address detector, are achieved by logical circuits in this detector under the control of the element and sub-element timing waveform. The voltages across the different capacitors, in each of the two discrete address detectors, are added together in an adding circuit within the discrete address detector and the resultant voltage obtained is in each case fed to the output terminal of the discrete-address selector.

The output terminals 219 and 220 of the discrete-address detectors 217 and 218 are connected to the input terminals of a voltage comparator 221. The voltage comparator is arranged to produce an output signal having a fixed positive value when the positive voltage at the terminal 219 is greater than that at the terminal 220 and a fixed negative value when the positive voltage at the terminal 220 is greater than that at the terminal 219. The voltage comparator therefore compares the received signal levels corresponding to the constant-frequency signal elements 0 and 1.

A bistable sampling circuit 222 has a signal input connected to the output, of the voltage comparator 221, and a timing input connected to the terminal 213. At every positive pulse in the element timing waveform this circuit 222 samples the output signal from the voltage comparator 221 and produces an output voltage at each of two output terminals 223 and 224 having a fixed magnitude and the same polarity as the sampled voltage at the signal input. The circuit 222 is so arranged that the voltage at each of the terminals 223 and 224 remains at the value to which it was set at a positive pulse in the element timing waveform, until the next positive pulse arrives. It is then reset to the same or opposite polarity, depending upon the voltage at the signal input.

Thus the voltage at the signal input of the circuit 222 indicates whether the detected signal on the address of the particular receiver corresponds more nearly to an element 0 or to an element 1. A negative voltage at the signal input of the circuit 222 indicates that on the arrival of the timing pulse, the received signal element more nearly resembled a 1, and a positive voltage the said input indicates that the element more nearly resembled a 0. The signal at each of the terminals 223 and 224 is thus a detected and regenerated signal corresponding to the received constant-frequency FM signal, and it is of course synchronized to the element timing waveform in the receiver.

The difference between the signals at the terminals 223 and 224 is as follows. Each of these is derived from a separate bistable circuit. The bistable circuit feeding the terminal 224 is sensitive to small voltage levels at the output of the voltage comparator 221, so that it will change state on receipt of a positive pulse in the element timing waveform, even when the input voltage to the circuit 222 has only a very small value, provided that it is of opposite polarity to that at the previous positive pulse in the element timing waveform. The bistable circuit feeding the terminal 223, however, is appreciably less sensitive, so that it will only change state at a positive pulse in the element timing waveform, when the inputs voltage to the circuits 222 has a predetermined maximum magnitude. Under these conditions the transition of the output signals at the terminal 223 from one state to the other, indicates that constant-frequency signal corresponding to the latter of the two binary elements, has been received at a predetermined minimum power level. With this arrangement the signal pattern on the average least likely to be produced at the terminal 223, by the various unwanted signals at the receiver input, is the pattern 101010 . . . , which represents the calling signal. Thus if the signal at the terminal 223 is used to indicate the presence of the calling-signal the probability of a spurious indication being given is very small.

A calling-signal detector 225 having two inputs, comprises a single element store, an exclusive-OR gate and a counter comprising four bistable stages. One of the inputs is connected to the terminal 223 and the other to the terminal 213.

The check for the correct signal pattern is achieved as follows. Each new element received from the terminal 223, is compared by the exclusive-OR gate with the element which has been stored in the single element store. When the correct pattern of alternate 1's and 0's is being received, each new element will always differ from the preceding element and the output from the exclusive-OR gate will remain negative. Under these conditions the positive pulses in the element timing waveform, received from the terminal 213, are fed through to the input of the counter, where each positive pulse causes the counter to increase its count by one. Whenever two adjacent elements are either both 1 or both 0 the output from the exclusive-OR gate is positive and this is used to block the corresponding positive pulse in the element timing waveform, from the input to the counter this positive pulse now being used instead to reset to counter to zero. Each positive pulse in the timing waveform, of course indicates the arrival of a new signal element.

When the counter is full indicating the detection of fifteen successive elements with the correct signal pattern, the output of the calling signal detector 225 goes positive. This means that a calling signal having both the correct constant-frequency discrete-addresses and also the correct sequence of 1's and 0's, has been received over 15 successive signal elements. Once the signal at the output of calling signal detector 225 has gone positive, it remains in this condition for the rest of the call.

Until the calling signal detector 225 has recognised a calling signal, there is no way in which the sub-element timing waveform generator can be synchronized to any received signal. In order to ensure that a calling signal is detected shortly after it arrives, steps must be taken to ensure that the element timing waveform is brought into phase with this signal sufficiently quickly to allow fifteen elements to be detected before transmission of the calling signal ceases.

This phase adjustment is effected by means of a frequency shift circuit 226 comprising a multivibrator whose period is equal to that of about a hundred signal elements. At the end of each cycle the multivibrator triggers a single shot which gives a positive pulse of duration equal to that of one element. This signal is applied to the control terminal 210 of the sub-element timing waveform generator. The amplitude of the positive pulse is arranged to be such that, over the duration of each pulse, the phase of the element timing waveform is advanced by half the duration of a sub-element. Thus over each period of 100 elements the phase of the element timing waveform signal, differs by half the duration of a sub-element, from its value over the previous 100 elements. Thus within the period occupied by a number of signal elements approximately equal to 200 times the number of time-slots in the frequency-time matrix, the element timing waveform will be brought to within a quarter of a sub-elements duration of the correct phase. It will remain in this condition during the reception of 100 elements, by the end of which time the calling signal should have been detected. When the signal at the output of the calling signal goes positive, that is on detection of a calling signal, the frequency shift circuit 226 is disabled.

When the calling signal detector 225 has recognized a calling signal, the sub-element timing waveform generator 210 can be synchronized with the corresponding waveform generator 105 in the transmitter which is transmitting the calling signal. An arrangement for effecting this includes an adder 230, the inputs of which are connected to the terminals 219 and 220 and the output to a band-pass filter 231 which is tuned to a frequency which is several times lower than the signal element rate. The output of the filter 231 is connected to one input of a product modulator 232.

The synchronizing arrangement also includes an oscillator 233 which is arranged to generate a sine wave of the same frequency as that to which the band-pass filter 231 is tuned. The output of the oscillator 233 is connected via a —90° phase shifter 234 to the other input of the product modulator 232. The output of the product modulator 232 is connected via a low-pass filter 235 to one input of an adder 236, the other input of which is connected directly to the output of the oscillator 233. The output of the adder 236 is connected via a 3 input AND gate 237 to the control terminal 210 of the oscillator 204.

In operation, the mean level of the output signal from the adder 230 is proportional to the detected signal level. With the particular code used here for the calling signal, a very small output signal is obtained from the band-pass filter 231, even when the element timing waveform is not synchronized to the wanted input signal. As a result the output signal from the product modulator 232 and therefore also the output signal from the low-pass filter 235, are both very small. Thus the output signal from the adder 236 is the sine wave fed directly to the adder 236 from the oscillator 233.

As stated above, until a calling signal is detected in any call, the output of the calling-signal detector 225 is a negative voltage. This voltage keeps the AND gate 237 closed, thus preventing the transmission of the output of the adder 236 to the control terminal 210. When a calling signal is detected, the output of the calling signal detector 225 goes positive, the output of the adder is fed to the control terminal 210 and acts as a frequency modulating signal for the sub-element timing waveform generator 209. The frequency of the sub-element timing waveform is now modulated to give a very small positive and negative frequency-deviation in the pulse repetition rate. A positive voltage at the terminal 210 causes an increase in the frequency of the sub-element timing waveform, and a negative voltage causes a reduction in this frequency.

When the output of the sub-element timing waveform generator 209 is in phase with the sub-elements timing waveform of the transmitted signal, the output of the adder 236 consists of the direct output from the oscillator 233, which is a sine wave. Thus the two discrete-address detectors 217 and 218 together undergo a regular variation in the phase of the locally generated frequency-time matrices relative to those of the received signal, the maximum phase deviation being a small fraction of the duration of a sub-element. In consequence of this, the output voltage from adder 230, which is proportioned to the detected signal level will also vary approximately sinusoidally at the same frequency. This frequency is sufficiently low for there to be a negligible phase shift between the sine wave at the output of the −90° phase shifter 234 and the resultant sinusoidal component in the signal at the output of the adder 230.

When the sub-element timing waveform generated in the receiver is lagging in phase relative to that of the received signal, the output signal from −90° phase shifter 234 and the resultant sinusoidal component in the signal at the output of the adder 230 are in phase, causing a positive D.C. voltage to tbe produced at the output of the product modulator 232. This D.C. voltage is fed through the adder 236 to the terminal 210, thus causing an increase in the frequency of the sub-element timing waveform generator 209.

Similarly, when the sub-element timing waveform generated in the receiver is leading in phase relative to that of the received signal, the output signal from the −90° phase shifter and the resultant sinusoidal component in the signal at the output of the adder 230 are in anti-phase, giving a negative output voltage which is fed through the adder 236 at the terminal 210 and reduces the frequency of the sub-element timing waveform generator 209.

In each case, the effect of the feedback control signal is to reduce the phase error between the element timing waveform and the received signal. Thus a point of stable equilibrium is obtained when there is no phase error, and the system automatically adjusts itself into this state. Superimposed on the operation just described is the small sinusoidal phase variation introduced into the sub-element timing waveform, by the sine wave which is fed directly from the oscillator 233 to the adder 236 and so on through to the terminal 210. Since only a very small phase deviation need be introduced here, its effect on the detection of the received signal can be made negligible.

The terminal 224 is connected to the signal input of a count-down signal detector 240. The latter also has a control input which is connected to the output of the calling signal detector 225. Operation of the count-down signal detector 225 is inhibited unless there is a positive voltage on this control input, that is, unless a calling signal has been detected.

The preferred form, of the timing signal consists of a series of separate characters or groups of elements each of which has a unique code. The end of each character in the count-down signal is at a different known time-interval from the beginning of the first element in the sequentially-switched varying-frequency signal. The code used for each character is chosen to be such that the maximum possible number of errors are required to produce a spurious timing character, either during the transmission of the calling signal or else during the transmission of the count-down signal itself but in the wrong position.

The count-down signal described here consists of four characters each consisting of eight elements.

The first timing character is 00001111, the second is 01111111, the third is 00000001 and the fourth is 00111000. The fourth timing character is followed by a three element separator signal 101. Thus the complete count down signal is 00001111011111110000000100111-000101. Transmission of the varying frequency sequentially switched address signal immediately follows the separator signal.

The count-down signal detector 240 contains four logic circuits each of which has an associated single shot timing circuit. Each logic circuit is arranged to examine the detected signal at the terminal 224 for a different one of the four timing-characters. This function can be achieved by circuits of known design. If the received signal contains any one of the four timing-characters immediately preceded by the correct element, the corresponding logic circuit detects the presence of a valid timing signal and operates its associated single-shot timing circuit. The latter is arranged to reset half way through the last element in the count down signal. The resetting of any one of the four single-shot timing circuits is arranged to produce an output signal indicating that the next positive pulse in the element timing waveform corresponds to the start of sequentially-switched varying frequency operation.

The purpose of the separator signal at the end of the count-down signal is to permit an adequate time interval between the detection of the last timing character and the starting of the sequentially-switched address generator in the receiver, in order to allow for the delay involved in setting the corresponding single shot timing circuit if this timing character is the only one to be detected.

The particular signal code shown here requires in general at least three element errors in any sequence of nine elements to cause the transition to sequentially-switched varying-frequency operation to occur at the wrong time. On the other hand, one or more errors in each timing character will prevent the transition to sequential switching from taking place at all, so that the call is lost. The probability of this happening can be reduced by providing a larger number of logical circuits and transmitting a corresponding larger number of different timing characters. Under these circumstances more elements per character are required to maintain the same protection against a timing character being produced in the wrong place by noise. An appreciable increase in complexity is therefore involved.

The reason for the choice of a code giving considerable protection against the production of false timing characters, is that the transmitter has no knowledge of the instant at which the receiver detects the calling signal, so that it must transmit this signal for a sufficiently long period to ensure its detection under the least favourable conditions unless the receiver is already engaged on a call. In the case where the calling signal is rapidly detected, the count-down signal detector will examine a relatively long transmission of the calling signal, and, in the presence of appreciable inter-channel interference, there is a high probability that a suprious timing-character will be produced during the calling signal.

The essential property required of the count-down signal detector is that it should neither mistake a noisy signal for a valid timing character nor fail to detect at least one of the timing characters transmitted. These are of course conflicting requirements, since an improvement in one of these tends to degrade the other. In the solution described above, in which it is very unlikely that a timing character will be reproduced elsewhere in the signal as a result of noise but in which only a single error is needed to prevent a character it being correctly detected. The receiver is given four opportunities of detecting a timing character. This provides a good compromise between the two requirements, which can be achieved without involving excessively complex equipment.

The output of the count-down signal detector 240 is connected to the "set" input of a bistable circuit 241, which has two output terminals one 242 of which is at a negative voltage in the "set" condition and at a positive voltage in the "reset" condition and the other 243 of which is at a positive voltage in the "set" condition and at a negative voltage in the "reset" condition. The terminal 242 is connected to the third input of the gate 237. The terminal 243 is connected to the information signal detecting unit 204.

When an output signal is received from the count-down signal detector 240, the bistable circuit changes from the "reset" to the "set" condition. The negative voltage on the terminal 242 closes the gate 237, cutting off the synchronizing signals from the calling signal detector unit 203 to the sub-element timing waveform generator 209. The positive voltage at the terminal 243 causes the information signal to start operating as will be described hereinafter, and may also be used to operate a calling signal indicator (not shown) which gives a visual and/or audible indication of the establishment of a connector.

As stated above, the varying frequency signal carrying the required information is detected by multiplying the received signal with a reference signal having the same instantaneous frequency as that of the carrier signal and the same phase as the signal representing one of the digits. This reference signal is generated in the information signal detecting unit by an arrangement comprising a sequentially switched address generator 250 having inputs connected to the terminals 212 and 213 respectively. An integrator 251 is connected to the sequentially switched address generator 250. The output of the integrator 251 is connected via an adder 252 to the modulating input of a frequency modulated oscillator 253. The sequentially-switched address generator 250 has a differentiator 254 connected to its reset input, the input of the differentiator 254 being connected to the terminal 243. The sequentially switched address generator 250, the integrator 251, the frequency-modulated oscillator 253 and the differentiator 254 operate in a similar manner to the sequentially switched address generator 127, the integrator 129, the frequency-modulated oscillator 130 and the differentiator 128 in the transmitter, the reset pulse to the sequentially-switched address generator 250 from the differentiator 254, being produced when the voltage on the terminal 243 goes positive, that is during the last element of the separator signal. The adder 252 is used to achieve and maintain synchronisation between the oscillator 253 and the corresponding oscillator 130 in the transmitter in a manner which will be more fully described hereinafter. When synchronisation has been achieved, the output waveforms of the sequentially switched address generator 250 and the integrator 251 are identical with the waveforms C and D (FIG. 19).

The terminal 243 is also connected to one input of a gate 260, the other input of which is connected to the terminal 216. The output of the gate 260 is connected to one input of each of two coherent detectors 261 and 262. The other input of the detector 261 is connected to the output of the frequency modulated oscillator 253 directly, and the other input of the detector 262 is connected to the output of the oscillator 253 via a $-90°$ shifter 263. The outputs of the coherent detectors 261 and 262 are connected respectively to low-pass filters 264 and 265, the effective integration period of each of which is approximately equal to the duration of a signal element.

As previously described, a positive voltage is formed on the terminal 243 when transmission of the varying frequency sequentially switched address signals is about to start. This positive voltage opens the gate 260, thus connecting the signal from the input unit 202 to the corresponding inputs of the coherent detectors 261 and 262. In each of the coherent detectors 261 and 262, this signal is multiplied by the respective reference signal from the oscillator 253. The output signal from each of the low-pass filters 264 and 265 is positive if the received signal over the preceding integration period was on the average more nearly in phase with the reference signal and it is negative if the received signal over the preceding integration period was on the average more nearly in anti-phase with the reference signal.

If the mean output frequency of the frequency-modulated oscillator 253 is relatively low, it is preferable to use a multivibrator as the oscillator 253. The oscillator 253 can then itself be designed to give the required low phase quadrative outputs and the $-90°$ phase shifter 263 is not required.

The output of the low-pass filter 265 is connected to the input of a D.C. polarity detector 266, the output of which is arranged to have a fixed positive voltage when the input signal is above zero volts, and a fixed negative voltage when the input signal is below zero volts. The output from the polarity detector 266 is connected to the control input of a D.C. polarity switch 267 the signal input of which is connected to the output the low-pass filter 264. The circuit of the polarity switch 267 is so arranged that when the signal at the control input is positive, the output signal has the same polarity as the signal input, but when the signal at the control input is negative, the output signal has the opposite polarity to that of the signal at the signal input.

The output of the D.C. polarity switch 267 is connected to the second input of the adder 252 via a low-pass filter 268, the effective integration period of which is much longer than that of the low-pass filters 264 and 265 and whose bandwidths is therefore much smaller.

The output of the D.C. polarity switch 267 is also connected to one input of a two input AND gate 270 via a low-pass filter 269, the integration period of which is similar to that of the filter 268. The other input of the AND gate 270 is connected to the terminal 243 and the output to the terminal 210.

The primary function of the coherent detector 261, the low-pass filter 269, the D.C. polarity switch 267 and the low-pass filter 264, is to provide a control signal for the frequency-modulated oscillator 253, and the sub-element timing waveform generator 209. The arrangement operates as follows.

So long as the reference signal at the output of the phase shifter 263 is exactly in phase with the received signal carrier at the gate 260, the reference carrier at the output of the oscillator 253 is at 90° with the wanted signal, so that the average output signal from the low-pass filter 264 is zero volts, giving zero volts at the output of the low-pass filter, 268. Thus the frequency-modulated oscillator 253 oscillates under the sole control of the sequentially-switched address generator 250 and the sub-element timing waveform generator 209 is permitted to oscillate at its natural frequency.

When the phase of the reference signal at the output of the phase shifter 263 lags that of the received signal from the gate 260, by an angle less than 90° then the reference signal at the output of the frequency modulated oscillator 253 leads the wanted signal carrier at the gate 260 by an angle less than 90°. Thus the two reference signals produced by the frequency modulated oscillator 253 are both more nearly in phase than in anti-phase with the wanted signal carrier at the gate 260. The output signals from the low-pass filters 264 and 265 are therefore each positive, giving a positive control signal at the outputs of the low-pass filters 268 and 270 which increases the mean frequency of the frequency-modulated oscillator 253. The former advances the phase of each reference signal until the reference signal at the output of the phase shifter 263 is in phase with the received signal, at which point the magnitude of the control signal at the output of the low-pass filter 268 drops to zero volts.

When the phase of the reference signal at the output of the phase shifter 263 leads that of the received signal by an angle less than 90°, then the reference signal at the ouptut of the frequency modulated oscillator 253 leads the received signal by an angle between 90 and 180°. The output signals from the low-pass filters 264 and 265 are now positive and negative respectively, giving a negative control signal at the outputs of the low-pass filter 268. A negative voltage at the output of the filter 268 decreases the mean frequency of the frequency-modulated oscillator 253 thus retarding the phase of each reference signal until the reference signal at the output of the oscillator 253 is again in phase with the received signal.

The condition where the reference signal at the output of the phase shifter 263 is in phase with the received signal is therefore one of stable equilibrium, so that if the reference carrier at the output of the phase shifter 263 is within 90° of the wanted signal, the system will automatically "lock" onto the wanted signal with the two carriers in phase.

When the phase of the reference signal at the output of the phase shifter 263 lags the received signal by an angle between 90° and 180°, the reference signal at the output of the oscillator 253 lags the received signal by an angles less than 90°. The output signals from the low-pass filters 264 and 265 are therefore negative and positive respectively, giving a negative control signal at the output of the filter 268. This retards the phase of each reference carrier until the reference carrier at the output of the phase shifter 263 is exactly 180° out of phase with the wanted signal, at which point the magnitude of the control signal at the output of the filter 268 drops to zero volts.

When the phase of the reference signal at the output of the phase shifter 263 leads that of the received signal by an angle between 90 and 180° the reference signal at the output of the oscillator 262 lags the wanted signal by an angle between 90 and 180°. The output signals from the low-pass filter 264 and 265 are therefore both negative, giving a positive control signal at the output filter 268. This advances the phase of each reference carrier until the reference signal at the output of the phase shifter 263 is exactly 180° out of phase with the received signal.

The condition where the reference signal at the output of the phase shifter 263 is 180° out of phase which the wanted signal, is therefore another point of stable equilibrium so that if the reference signal at the output of the phase shifter 263 is within 90° of this point, the system will automatically "lock" onto the wanted signal, with the two carriers exactly in anti-phase.

It follows that once the system begins to lock onto the received signal, having selected either of the two stable conditions as the target for phase synchronization, it is unaffected by subsequent sudden phase-shifts of 180° in the received signal. Thus the binary phase-modulation of the varying-frequency signal does not affect the correct synchronization of the coherent detectors.

The polarity of the signal at the output of the filter 269 is always the same as that of the output of the filter 268. When the voltage on the terminal 243 is positive, the gate 270 is open and the output of the filter 269 is connected to the terminal 210 of the sub-element timing waveform generator 209. The latter, is thus kept synchronized with the received signal.

The output of the D.C. polarity detector 266, the signal on which has a waveform G (FIG. 19), is also connected to one input of a two-input bistable sampling circuit 280. The other input is connected to the terminal 213. The arrangement is such that the circuit 280 produces an output signal, the polarity of which, at any instant, is the same as the polarity of the input from the D.C. polarity detector at the instant when the last timing waveform pulse was received from the terminal 213. The output signal is therefore a square wave signal (waveform H, FIG. 19) in which a 1 is represented by a positive or negative transition and an 0 is represented by no change in level.

The output of the bistable sampling circuit is connected to one input of a bistable comparator circuit 281 the other input of which is connected to the terminal 213. This circuit 281 is arranged to compare each element, as it is received, with the previous element, which has been previously stored in the bistable circuit. After each comparison, the newly received element is stored in the bistable circuit in place of the previous element, so that it can be compared with the next element received. The output from the circuit 281 is negative when the two adjacent elements being compared are different and it is positive when they are the same (waveform J, FIG. 19). The received signal is therefore recoded into the form where a 1 is represented by a negative level and an 0 by a positive level.

The output of the filter 265 is also connected to the input of a full-wave rectifying and smoothing circuit 232 which is arranged to produce at its output a positive D.C. voltage which is proportional to the peak positive and negative levels in the signal at its input. The magnitude of the positive D.C. voltage is thus a measure of the detected signal level at the output of the filter 264.

The outputs of the bistable comparator circuit 281 and the full-wave rectifying and smoothing circuit 282 are connected respectively to two of the inputs of a three input AND gate 283, the third input is connected to the terminal 243. The output of the gate 283 is connected to the output unit 205 which is arranged to decode the binary digital signal. The gate 283 is so arranged that the signal from the bistable comparator circuit 281 is connected to the output unit 205 only when the voltage on the terminal 243 is positive and when the output of the circuit 282 has at least a predetermined minimum positive value. Thus an output is received only when a varying frequency signal is being received and the received signal has a predetermined minimum strength.

According to another embodiment of the invention a varying frequency phase-modulated signal is used and the sequential switching of addresses is achieved by using a discrete address whose frequency-time trace has a duration very much longer than that of a signal element. A different discrete address is allocated to each receiver and the presence of a carrier signal on a particular address is used as an indication that the corresponding receiver is being called, no separate calling signal being required. Each discrete address is produced by adding together the outputs of the two oscillators operating at different frequencies, one of which is very much higher than the other. The varying frequency carrier signal can be generated by using a single oscillator to produce a sine wave having a much longer period than the element timing waveform. However it is preferable to use two or more mutually unsynchronized oscillators to generate a number of sine waves and to add these sine waves together to produce the required varying frequency signal.

Referring to FIG. 22, a transmitter for use with this embodiment comprises an address generating unit 301, an element timing waveform generator 302, an information signal modulating unit 303 and an output unit 304.

The address generating unit 301 comprises two address oscillators 310 and 311, an adder 312 and a frequency modulated oscillator 313. The frequencies of the outputs of the address oscillators 310 and 311 can be adjusted so that they generate the two components of the address of a receiver with which it is desired to communicate. For one such address the outputs of the address oscillators 310 and 311 have the waveform K and L respectively (see FIG. 23).

The outputs of the address oscillators 310 and 311 are connected to the input of the adder 312, the output of which is connected to the modulating input of the frequency modulated oscillator 313. The natural frequency of the latter is equal to the centre frequency of the frequency band occupied by the frequency time matrix of the system. The output of the frequency modulated oscillator 313 is the varying frequency carrier signal.

The information signal modulating unit 303 comprises a digitizer 320, a two-input gating unit consisting of an OR gate 322 and a one input device 323 similar to an AND gate, a "divide by 2" stage 324 and a phase modulator 325. The information signal modulating unit 303 is identical with the corresponding unit 103 in the transmitter illustrated in FIG. 18 and operates in the same way, the output of the frequency-modulated oscillator 313 being connected to the carrier signal input of the phase modulator 325. The output of the element timing waveform generator 302 is connected to the digitizer 320 and the OR gate 322. The output of the phase modulator 325 is connected to the input of the output unit 304 which operates in the same way as the output stage 125 (FIG. 18).

Referring now to FIG. 24, a receiver for use with the transmitter illustrated in FIG. 22, comprises an input unit 401, a discrete address detecting unit 402 an element timing waveform generator 403, an information signal detecting unit 404 and an output unit 405.

The input stage 401 comprises a band-pass filter 410 and an automatic gain controlled amplifier 411 which serves the same purpose as the band-pass filter 215 and the amplifier 215 of the input stage 202 of the receiver illustrated in FIG. 21, the gain of the amplifier 216 being controlled by a pilot signal.

The discrete address detecting unit 402 comprises an incoherent FM discriminator 412 and a square law envelope detector 413, the inputs of which are connected to the output of the amplifier 411 and the outputs of which are connected to the inputs of a product modulator 414. The delay introduced by the square law envelope detector 413 is equal to that introduced by the incoherent FM discriminator 412. The output of the product modulator 414 is connected to the inputs of two correlation detectors 415 and 416.

The correlation detector 415 consists of a first product modulator 420, the output of which is connected via a first low-pass filter 421 to the control output of an oscillator 422 the output frequency of which is equal to the frequency $f_1$ of one of the components of the discrete address of the receiver. The output of the oscillator 422 is connected both directly to one of the inputs of the products modulator 420 and via a −90° phase shifter 423 to one of the inputs of a second product modulator 424. The other inputs of the two product modulators 420 and 424 form the input of the correlation detector 415. The output of the second product modulator 424 is connected via a second low-pass filter 425 to a level detector 426.

The correlation detector 416, consists of similarly connected first and second product modulators 430 and 434 first and second low-pass filters 431 and 435, an oscillator 432, a −90° phase-shifter 433 and a level detector 436. The output frequency of the oscillator 432 is equal to the frequency $f_2$ of the other component of the discrete address of the receiver.

The outputs of the two level detectors 426 and 436 are connected to the inputs of an AND gate 440 the output of which is connected to an integrating level detector 441. The output of the level detector 441 is connected to a calling indicator 442 and a bistable circuit 443.

In operation, the output signal from the receiver input-stage 401, fed to the FM discriminator 412 and to the square-law envelope detector 413, produces a resultant detected signal at the output of the product modulator 414 which contains, in addition to a number of intermodulation products, a series of waveforms the voltage of each of which varies with the instantaneous frequency of a different one of the received signals.

The method of operation of the two correlation detectors 415 and 416 is the same and will now be described with reference to the detector 415. The function of this circuit is to adjust the waveform at the output of the −90° phase shifter 423 to be exactly in phase with the $f_1$ c./s. sine wave component at output of the product modulator 414. The waveform at the input of the −90° phase shifter 423 is used to modulate the signal at the output of the product modulator 414 in the product modulator 420. If the latter signal contains no component of the same frequency as the output of the oscillator 422, then there will be no D.C. component at the output of the product modulator 420. Since the low-pass filter 421 has a cut-off frequency which is low enough to ensure that all the A.C. components at the output of the product modulator 420 are filtered out, the signal at the control input of the oscillator 421 is then zero.

Under these conditions the oscillator 422 oscillates at its natural frequency $f_2$. Furthermore, if there is no $f_1$ c./s. frequency component at the output of the product modulator 414 there will also be no D.C. component at the output of the product modulator 424.

When the signals at the output of the product modulator 414 include an $f_1$ c./s. sine wave component, the feedback control loop involving the product modulator 420 and the low-pass filter 421 automatically adjusts the frequency and phase of the sine wave at the output of the −90° phase shifter 423 to coincide with those of the $f_1$ c./s. component.

Once stable equilibrium has been obtained, the signal at the output of the product modulator 424 contains a positive D.C. component the magnitude of which is proportional to the voltage level of the $f_1$ c./s. sine wave at the output of the product modulator 414. This is the required detected signal. In addition there are a large number of different A.C. components which are removed by the low-pass filter 425, leaving only the required D.C. component at the input of the level detector 426. The output signal from the level detector 426 is maintained at zero volts unless the input signal exceeds a predetermined threshold level, in which case the output signal is a predetermined positive voltage. Thus, the level detector 426 gives an output signal only when an input signal of frequency $f_1$ c./s. is detected at not less than a predetermined minimum strength.

As previously stated, the correlation detector 416 is similar to the correlation detector 415 and the method of operation is the same. Thus, the level detector 426 gives an output signal at a predetermined positive voltage when an input signal of frequency $f_2$ c./s. is detected at not less than a predetermined minimum strength, and zero output when such a signal is not detected.

The AND gate 440 is arranged to give an output of zero volts unless the outputs from both level detectors 426 and 436 are positive, in which case the output has a fixed positive voltage. The integrating level detector 441 is arranged to give a positive output signal at a predetermined time after the output of the AND gate 440 goes positive, provided the signal at the output of the AND gate 440 remains positive during this period. The signal at the output of the integrating level detector 441 does not respond to rapid oscillations in the waveform at its input. A positive output signal from the integrating level detector 441 operates the calling indicator 443. At the same time, the bistable circuit 443 which was set to give a negative signal at its output when the previous connection was terminated, is reset to give a positive output signal and this signal remains postive for the rest of the call.

The information signal detecting unit 404 comprises a frequency-modulated oscillator 450 the natural frequency of which is the same as that of the oscillator 313 in the transmitter illustrated in FIG. 22, a −90° phase shifter 451, two coherent detectors 452 and 453, two low-pass filters 454 and 455, a D.C. polarity detector 456, a D.C.

produce zero output. The signal at the control input of the oscillator 543 is therefore also zero.

When the output square-wave S from the oscillator 543 lags the signal Q by less than half a cycle of the signal S, at each positive pulse in the signal R, the waveform $\overline{S}$ is negative. The rising edge of the positive pulse in the signal S is thus fed through the OR gate 520 and coupling capacitor 521 to the "set" input of the bistable circuit 523, setting this circuit into the "on" condition where its output voltage is at a fixed positive level. The next transition in the waveform $\overline{S}$ is a rising edge which is fed via the coupling capacitor to the "reset" input of the bistable circuit 523. This resets the circuit into the "off" condition, where its output voltage is at zero volts. The limiter 525, which couples the signal $\overline{S}$ to the OR gate, prevents the rising edge in the waveform $\overline{S}$ from triggering the "set" input of the bistable circuit 523. It follows that the output signal from the bistable circuit 523 remains positive for a period proportional to the time delay between the positive pulse in R and the corresponding negative-going transition in the waveform S.

Under the conditions being considered, the waveform S is positive every time a positive pulse occurs in R, so that these positive pulses are blocked from the "set" input of the bistable circuit 523 since the output of the OR gate 530 has relatively slowly risen to a positive voltage. At the same time each rising edge in the waveform $\overline{S}$ is fed via the coupling capacitor 526 to the "reset" input of the bistable circuit 533. The latter therefore remains in the "off" condition, with its output signal at zero volts. This holds the following gate closed, thus feeding zero volts from this gate to the adder 540.

It follows that, when the square-wave S lags the detected-signal Q by less than half a cycle of the signal S, then every time there is a positive pulse in S, the output signal from the adder 540 contains a positive pulse of fixed level, whose duration is proportional to the phase error in the waveform S.

The D.C. component in this signal is isolated in the low-pass filter 542, to give a resultant positive voltage which is fed to the phase-locked oscillator 543 as the frequency-control signal. The positive voltage causes a corresponding increase in the oscillator frequency thus reducing the phase error until this falls to zero, when the frequency-control signal also falls to zero.

When the output square-wave S from the phase-locked oscillator leads the detected signal Q by less than half a cycle of the signal S, at each positive pulse in the signal R, the waveform S is negative. The rising edge of the positive pulse in the signal R is thus fed through the OR gate 530 and coupling capacitor 531 to the "set" input of the bistable circuit 533 setting this circuit into the "on" condition where its output voltage is at a fixed positive level. The circuit remains in the "on" condition until the next positive-going edge in the waveform S, which resets the bistable circuit 533 to the "off" condition, where its output is at zero volts. While the bistable circuit 533 is in the "on" condition it holds the AND gate 541 open, thus allowing the waveform $\overline{S}$ to pass through the adder 540. The waveform $\overline{S}$ is symmetrical about zero volts, its positive voltage being the same as that obtained from the output of the bistable circuit 523 when this is in the "on" condition. The segment of the waveform $\overline{S}$ allowed through the gate, following every positive pulse in the waveform R, contains one complete negative half-cycle of the waveform S and the portion of a positive half-cycle whose duration is equal to the difference between the period of a complete half-cycle and the timing error in the waveform S. Thus, when the waveform S leads the detected signal Q by a negligible fraction of one half-cycle of S, approximately one complete cycle of the waveform $\overline{S}$ is passed through the gate following every positive pulse in R. The resultant signal contains a negligible D.C. component when the waveform S leads the detected signal Q by a noticeable fraction of one half-cycle of S, then during every period that the gate is held open, the resultant D.C. component obtained is equivalent to that obtained from a negative pulse whose magnitude is equal to that of the positive output voltage obtained from the bistable circuit 523 when this is in the "on" condition, and whose duration is equal to the time delay between negative-going edge in the waveform S and the corresponding pulse in R.

Under the conditions just being considered, the waveform $\overline{S}$ is positive every time a positive pulse occurs in R, so that then positive pulses are blocked from the "set" input of the bistable circuit 523. At the same time each rising edge in the waveform $\overline{S}$ is fed via the coupling capacitor to the "reset" input of the bistable circuit 523. The latter therefore remains in the "off" condition, with its output signal at zero volts.

It follows that, when the square-wave S leads the detected signal Q by less than half a cycle of the signal S, then every time there is a positive pulse in R, the output signal fiom the adder 540 contains a resultant D.C. component which is equivalent to that obtained from a negative pulse of fixed level, whose duration is proportional to the phase error in the waveform S.

The negative D.C. component is isolated by the following low-pass filter and fed to the phase-locked oscillator as the frequency-control signal. The negative voltage causes a corresponding decrease in the oscillator frequency, thus reducing the phase error until this falls to zero, when the frequency control signal also falls to zero.

The phase of the square-wave signal S is thus automatically adjusted so that a positive pulse in R always coincides a negative-going edge in S. The required element timing waveform T is obtained from the signal S by differentiating this waveform in the circuit 544 to give a short positive pulse coinciding with every rising edge in S. Since the latter signal is a symmetrical square-wave, the positive pulses in the element timing waveform occur at the mid-point of every signal element in the detected signal Q.

It will be realised that, with both embodiments of the invention for which transmitters and receivers have been described, the total bandwidth occupied by the varying-frequency signals must be large compared with twice the element frequency so that the amplitude modulation of the wanted received signal, which results from the fact that this is a band-limited PM signal, only extends from a negligible period about any element boundary containing a phase inversion.

The use of the varying carrier frequency coherent system of the purpose of the invention in an arrangement of the transmission of digitally-coded speech signals provides an extremely effective system for handling speech signals.

When there is not too great a range of signal levels, this arrangement should enable about as many different channels to be used simultaneously for an acceptable level of inter-channel interference as a more conventional telephone system which transmits digitally-coded speech and uses a combination of F.D.M. and T.D.M. to separate the different channels. The somewhat greater complexity of the system described with reference to FIGS. 18 to 21 is largely nullified in applications where the need for secrecy is so important that the speech signals must be encrypted before transmission. The sequential switching of addresses can be used to perform the encryption and decryption. Such an arrangement can also be made considerably more difficult to jam or decipher than the equivalent arrangement using fixed addresses.

I claim:

1. Apparatus for transmitting and receiving one of a plurality of separate digital coded information-bearing signals on a common transmission path, in which the polarity switch 457, a low-pass filter 458 and an adder 459, the interconnections and manner of operation of which are similar to those of the corresponding circuits in FIG. 21. The sequentially-switched address generator 250 and the integrator 251 in FIG. 21 are replaced in FIG. 24 by the oscillators 422 and 432, which determine the frequency-time trace to be followed by the reference carriers for the coherent detectors. However, the receiver illustrated in FIG. 24 is not provided with a feedback loop fed via the D.C. polarity switch 457 from the coherent detector output, such as that comprising the low-pass filter 269 and the gate 270, fed from the D.C. polarity switch 457 (FIG. 21). Instead, the phase of the frequency time trace is controlled by the $f_1$ and $f_2$ c./s. sine waves at the output of the product modulator 414. This avoids the complications involved in the arrangement shown in FIG. 21 where more than one feedback loop is controlled from a single output signal. It also avoids the necessity for any switch-over between two different modes of operation in the receiver.

The output sine waves from the $f_1$ and $f_2$ c./s. oscillators 422 and 432, at outputs of the −90° phase shifters 423 and 433, are fed via the adder 459 to the frequency-modulated oscillator 450. The sum of these two waveforms frequency modulates the output of the oscillator 450 so that when the $f_1$ and $f_2$ c./s. oscillators 422 and 432 have been brought into phase with the $f_1$ and $f_2$ c./s. frequency components at the output of the product modulator 414, the resultant frequency-modulating waveform, which is applied to the oscillator 450 by the adder 459, will also be in phase with the sum of these two frequency components.

The received varying-frequency signals at the output of the amplifier 411 are fed via a delay network 460 to inputs of the coherent detectors 452 and 453. The delay introduced by the network 460 is arranged to be equal to that introduced by the FM discriminator 412. Thus, the sum of the $f_1$ and $f_2$ c./s. frequency components at the output of the product modulator 414 corresponds exactly to the frequency-time trace of the received varying-frequency signal at the respective inputs of the coherent detectors 452 and 453. Consequently the frequency-time trace followed by the output varying-frequency carrier of the frequency-modulated oscillator 450 corresponds closely to that of the wanted received signal at the inputs of the coherent detectors 452 and 453.

The feedback control loop applied to the frequency-modulator oscillator 450, via the coherent detector 452, the low-pass filter 454, the D.C. polarity switch 457, the low-pass filter 458 and the adder 459, now adjusts the phase of the output of the frequency-modulated oscillator 450 to its required value, in the same way as the corresponding circuits in FIG. 21. This helps to compensate for small errors in the phases of the output signals from the oscillators 422 and 432. Correct detection of the wanted received signal is then achieved by the coherent detector 453.

As stated with reference to the transmitter illustrated in FIG. 22, the binary-coded speech signals are transmitted by the binary phase-modulation of the transmitted varying-frequency signal. In order to prevent phase distortion effects being introduced into the $f_1$ and $f_2$ c./s. sine waves, at the output of the product modulator 114, as a result of this phase modulation, the following precaution is taken. Firstly, the FM discriminator 412 is arranged to be truly incoherent, so that its output signal is proportional to the instantaneous frequency of the received carrier signal and independent of its phase. Under these conditions the sudden phase inversions in the received signal, caused by the binary phase-modulator, have a negligible effect on the output signal from the FM discriminator provided that the received signal has a large number of carrier cycles per signal element. The element timing waveform generator 403, the construction and operation of which will be described in greater detail hereinafter, obtains synchronizing signals directly from the output of the D.C. polarity detector 456. As previously explained, in the binary code used a 1 is represented by a transition and a 0 appears as no change. Consequently a synchronising pulse is produced at the output of the D.C. polarity detector 456 only by an element 1. Therefore the coding used with this receiver must be so arranged that there is a definite upper limit to the number of consecutive signal elements which represent the digit 0.

The information signal detecting unit 404 also includes a bistable sampling circuit 461, a bistable comparator circuit 462, a full-wave rectifier and smoothing circuit 463 and an AND gate 464. These operate in the same way as the corresponding circuits in FIG. 21, the second input of the AND gate, which is arranged to prevent the production of an output signal except when a signal transmitted on the address of the receiver has been detected, being connected to the output of the bistable circuit 443. The output of the AND gate 464 is connected to the output unit 405 which is identical with the output unit 265 (FIG. 21).

Referring now to FIG. 25, the element timing waveform generator 403 (FIG. 24) comprises an inverter stage 501 and waveform generator stage 502.

The inverter stage 501 comprises an inverter 510, a first differentiator 511 and a first negative clamp 512 connected in series and a second differentiator 513 and a second negative clamp 514 also connected in series. The outputs of the negative clamps 512 and 514 are connected to the inputs of an OR gate 515.

In operation, the control input to the element timing waveform generator 402 (waveform Q, FIG. 26) is connected to the respective inputs of the inverter 510 and the second differentiator 513. A positive pulse is produced at the output of one of the differentiators 511 and 513 at each transition of the waveform Q and a negative pulse is produced at the other. The negative clamps 512 and 514 ensure that only the positive pulses are fed to the inputs of the OR gate 515, the output of which is a waveform R (FIG. 26) comprising a positive pulse for each transition of the waveform Q.

The waveform generator stage 502 includes a first OR gate 520 which is connected via a capacitor 521 and a diode 522 to the set input of a first bistable device 523. A discharge path for the capacitor 521 is provided by a resistor 524. The output of a limiter 525 (similar to the limiter 134, FIG. 18) is connected to one input of the OR gate 520. The input of the limiter 525 is also connected via a capacitor 526 and a diode 527 to the reset input of the first bistable device 523. The capacitor 526 is also provided with a discharge path 528.

A second OR gate 530, a capacitor 531, a diode 532, a resistor 524 and a limiter 525 form a similar circuit with the set input of a second bistable device 533. However, the reset input of the second bistable device 533 is connected via a diode 537 to the capacitor 526, so that both bistable devices 523 and 533 receive reset signals simultaneously.

The output of the first bistable device 523 is connected to one input of an adder 540. The output of the second bistable device 533 is connected to one input of an AND gate 541, the other input of which is connected to the capacitor 526. The output of the AND gate 541 is connected to the other input of the adder 540, the output of which is connected via a low-pass filter 542 to the control input of a phase-locked oscillator 543. The output of the oscillator 543 (waveform S, FIG. 26) is connected directly to the input of the limiter 535 and a differentiator and clamping circuit 544 output (waveform T, FIG. 26) and, via an inverter 545 (waveform $\overline{S}$, FIG. 26), to the input of the limiter 525.

When the waveform T is in the desired phase relation with the waveform Q, as shown in FIG. 26, a pulse in the waveform R always coincides with the rising edge of a positive pulse in the waveform $\overline{S}$, which leaves both bistable devices 523 and 533 reset, in which condition they transmitting apparatus comprises means for generating a carrier signal arranged to be modulated by the information bearing signal and to occupy one address in a frequency-time matrix, said frequency-time matirix comprising an array of unit areas each defined by a frequency band and a time slot and said address comprising a unique combination of said unit areas, and means for changing the address occupied by the carrier signals to the next address in a predetermined sequence of addresses after each frequency time matrix has been transmitted, and in which the receiving apparatus comprises means for receiving and demodulating information-bearing signals transmitted on a particular address and means for changing such address to the next address in said predetermined sequence after each frequency-time matrix has been received.

2. Apparatus as claimed in claim 1, in which the transmitting apparatus is provided with means for generating a calling signal and for transmitting it on a discrete address characteristic of the required receiver, prior to transmission of a signal on a sequentially changing address, the instantaneous carrier frequency remaining constant throughout each separate time slot of the calling signal.

3. Apparatus as claimed in claim 1, in which the information-bearing signals contains information in binary digital code form and each frequency-time matrix transmits a single element.

4. Apparatus as claimed in claim 3, in which each address comprises a predetermined number of separate areas of the frequency-time matrix, each area being coincident with a time slot, the mean initial frequency of each of which is equal to the mean frequency of one of the frequency bands, and the mean final frequency of each of which is equal to that of another frequency band, said predetermined number being the same for each address and each area transmitting a sub-element which indicates independently which digit is represented by the element.

5. Apparatus as claimed in claim 3, in which each address comprises a predetermined number of separate areas of the frequency-time matrix, the duration of each of which is equal to that of a time slot, and, for each area, either the initial frequency is equal to the mean frequency of the highest frequency band and the final frequency to that of the lowest frequency band or the initial frequency to that of the lowest frequency band the final frequency to that of the highest frequency band, said predetermined number being the same for each address and each area transmitting a sub-element which indicates independently which digit is represented by the element.

6. Apparatus as claimed in claim 3, in which each address comprises a predetermined number of separate unit areas of the frequency-time matrix, said number being the same for each address, the address being different according to which digit is represented by the element, the instantaneous carrier frequency being constant over the duration of each unit area and the frequencies of the signal corresponding to each of these being limited to the corresponding frequency band.

7. Apparatus as claimed in claim 6, in which the carrier signal is arranged to be frequency-modulated by the information-bearing signal, the modulation increasing the frequency of the carrier signal for one digit and decreasing such frequency of the other.

8. Apparatus as claimed in claim 6, in which the carrier signal is arranged to be amplitude-modulated by a signal containing one carrier cycle which is phase modulated by the information-bearing signal.

9. Apparatus as claimed in claim 6, in which the carrier signal is arranged to be frequency-modulated by the information-bearing signal and simultaneously amplitude-modulated by a phase modulated signal containing one carrier cycle which is modulated by the information-bearing signal, the phase difference between the frequency modulation and the amplitude modulation being constant.

10. Apparatus as claimed in claim 6, in which the carrier signal is frequency-modulated by a signal containing one square wave carrier cycle which is phase-modulated by the information-bearing signal.

11. Apparatus as claimed in claim 3, in which each address comprises a continuous, varying-frequency carrier signal.

12. Apparatus as claimed in claim 11, in which, for any particular address, the frequency difference between the instantaneous frequency of the signal arranged to represent the digit 1 and the central frequency of the matrix has equal magnitude and is opposite to the frequency difference between the instantaneous frequency of the signal arranged to represent the digit 0 and the central frequency of the matrix.

13. Apparatus as claimed in claim 11, in which, for any particular address, the information-bearing signal is arranged to be either in phase or 180° out of phase with a reference signal, a transition from one such phase relationship to the other between and adjacent pair of matrices representing the digit 1 and the absence of such a transition representing the digit 0.

14. Apparatus as claimed in claim 13, in which the receiving apparatus comprising means for generating a reference signal which has the same instantaneous frequency as the predetermined information-bearing signal and has the same phase as said information-bearing signal when the latter has one of said two possible carrier phases and means for multiplying the received signal and said reference signal.

15. Apparatus as claimed in claim 11, in which the transmitter and receiver are each provided with means for generating the sequence of addresses, each of said means comprising a psuedo-number generator arranged to produce a square wave and an integrating circuit arranged to convert the square wave, to a saw-tooth wave whereby the instantaneous frequency of the carrier signal varies linearly throughout each time slot.

16. Apparatus as claimed in claim 15 when dependent on claim 14, in which the calling signal comprises repetition of a predetermined combination of digits.

17. Apparatus as claimed in claim 16, in which the transmitting apparatus is provided with means for generating a synchronising signal and for transmitting it on said discrete address after said calling signal, said synchronising signal comprising a plurality of components each of which is arranged to indicate independently when sequential changing of the address will begin.

18. Apparatus as claimed in claim 11 in which the transmitter and the receiver are each provided with means for generating a sinusoidal wave, the output of which is arranged to modulate a carrier signal, and a timing waveform generator, not synchronised with the means for generating said sinusoidal wave, and arranged to provide a train or evenly spaced pulses marking the termination of each frequency-time matrix.

19. Apparatus as claimed in claim 18, in which the means for generating a sinusoidal wave comprises an oscillator arranged to generate a sine wave of longer period than that of the timing waveform.

20. Apparatus as claimed in claim 18, in which the means for generating a sinusoidal wave comprises two mutually unsynchronised oscillators each arranged to generate a sine wave, the frequency of one being greater than that of the other, and an adder, the inputs of which are connected to the outputs of the oscillators.

21. Apparatus as claimed in claim 20, in which the two mutually unsynchronised oscillators of the receiver are arranged to generate respective frequencies, the combination of such frequencies being characteristic of that receiver, and the oscillators of the transmitter are tuned to said characteristic frequencies.

(References on following page)

References Cited

UNITED STATES PATENTS

| | | | |
|---|---|---|---|
| 1,917,995 | 7/1933 | Polin | 340—171 |
| 2,600,405 | 6/1952 | Hoeppner | 340—171 |
| 2,694,140 | 11/1954 | Gilman | 325—51 |
| 3,037,190 | 5/1962 | Herbst | 179—15 |
| 3,160,711 | 12/1964 | Schroeder | 179—15 |
| 3,197,563 | 7/1965 | Hamsher | 179—15 |
| 3,310,741 | 3/1967 | Uitermark | 325—51 |

ROBERT L. GRIFFIN, Primary Examiner

CARL R. VONHELLENS, Assistant Examiner

U.S. Cl. X.R.

375—30, 55; 340—171